(12) United States Patent
Zhang et al.

(10) Patent No.: US 11,026,091 B2
(45) Date of Patent: Jun. 1, 2021

(54) DATA TRANSMISSION METHOD AND APPARATUS

(71) Applicant: Huawei Technologies Co., Ltd., Shenzhen (CN)

(72) Inventors: Hongping Zhang, Shanghai (CN); Le Yan, Shanghai (CN); Mingzeng Dai, Shanghai (CN); Qinghai Zeng, Shanghai (CN); Yi Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 16/220,711

(22) Filed: Dec. 14, 2018

(65) Prior Publication Data

US 2019/0124515 A1 Apr. 25, 2019

Related U.S. Application Data

(63) Continuation of application No. PCT/CN2016/087121, filed on Jun. 24, 2016.

(51) Int. Cl.
*H04W 12/106* (2021.01)
*H04W 36/34* (2009.01)
(Continued)

(52) U.S. Cl.
CPC ....... *H04W 12/106* (2021.01); *H04W 12/041* (2021.01); *H04W 12/30* (2021.01);
(Continued)

(58) Field of Classification Search
CPC ......... H04W 12/0401; H04W 12/0013; H04W 12/0017; H04W 12/1006; H04W 36/0016;
(Continued)

(56) References Cited

U.S. PATENT DOCUMENTS 7,006,472 B1 2/2006 Immonen et al.
10,512,116 B2 * 12/2019 Chang .................. H04W 76/32
(Continued)

FOREIGN PATENT DOCUMENTS

CN 101702818 A 5/2010
CN 102378198 A 3/2012
(Continued)

OTHER PUBLICATIONS

3rd Generation Partnership Project;Technical Specification Group Radio Access Network; Evolved Universal Terrestrial Radio Access (E-UTRA); Requirements for support of radio resource management (Release 11), 3GPP TS 36.133 V11.9.0 (Jul. 2014), 798 pages.

*Primary Examiner* — Jae Y Lee
*Assistant Examiner* — Aixa A Guadalupe Cruz
(74) *Attorney, Agent, or Firm* — Slater Matsil, LLP

(57) ABSTRACT

The present application provides a data transmission method in a wireless communication system. A first security parameter indication is introduced into uplink data on a first bearer, and a base station can determine, based on the first security parameter indication in the uplink data, whether first security processing of the uplink data is performed using a first security parameter or a second security parameter, so as to select a corresponding security parameter to perform second security processing; and a second security parameter indication is introduced into downlink data, and UE can determine, based on the second security parameter indication in the downlink data, whether the first security processing of the data is performed using the first security parameter or the second security parameter, so as to select a corresponding security parameter to perform the second security processing.

15 Claims, 7 Drawing Sheets

(51) Int. Cl.
  *H04W 36/06* (2009.01)
  *H04W 36/00* (2009.01)
  *H04W 12/30* (2021.01)
  *H04W 12/041* (2021.01)
  *H04W 76/15* (2018.01)
  *H04W 88/02* (2009.01)

(52) U.S. Cl.
  CPC ....... *H04W 36/0069* (2018.08); *H04W 36/06* (2013.01); *H04W 36/34* (2013.01); *H04W 76/15* (2018.02); *H04W 88/023* (2013.01); *H04W 36/0038* (2013.01)

(58) Field of Classification Search
  CPC ............. H04W 12/001; H04W 12/002; H04W 12/0023; H04W 12/0403; H04W 12/04031; H04W 12/04033; H04W 12/0806; H04W 36/00; H04W 36/0005
  See application file for complete search history.

(56) References Cited

U.S. PATENT DOCUMENTS

| | | | |
|---|---|---|---|
| 2013/0165124 | A1 | 6/2013 | Liang et al. |
| 2016/0044639 | A1* | 2/2016 | Yi .................... H04L 47/624 370/329 |
| 2016/0366175 | A1* | 12/2016 | Basu Mallick ..... H04L 63/1441 |
| 2017/0013668 | A1 | 1/2017 | Chang et al. |
| 2017/0215225 | A1* | 7/2017 | Yi .................... H04W 12/10 |

FOREIGN PATENT DOCUMENTS

| | | |
|---|---|---|
| CN | 102378225 A | 3/2012 |
| CN | 102378287 A | 3/2012 |
| CN | 102833741 A | 12/2012 |
| CN | 103813308 A | 5/2014 |
| EP | 2876839 A1 | 5/2015 |
| EP | 3125640 B1 | 2/2017 |
| WO | 2008092999 A1 | 8/2008 |
| WO | 2014094663 A1 | 6/2014 |
| WO | 2015143702 A1 | 10/2015 |
| WO | 2016000773 A1 | 1/2016 |

* cited by examiner

DATA TRANSMISSION METHOD AND APPARATUS

CROSS-REFERENCE TO RELATED APPLICATIONS

This application is a continuation of International Application No. PCT/CN2016/087121, filed on Jun. 24, 2016, the disclosure of which is hereby incorporated by reference in its entirety.

TECHNICAL FIELD

The present application relates to the field of wireless communications technologies, and specifically, to a data transmission method and an apparatus.

BACKGROUND

With development of a mobile communications system, the system can provide increasingly high service quality. To maintain a long-term competitive advantage of the 3rd Generation Partnership Project (3GPP), and further improve spectral efficiency and a user throughput of the system, an LTE-Advanced (LTE-A) standard is formulated. As a new technology, carrier aggregation (CA) is introduced into the LTE-A standard. Carrier aggregation means that user equipment (UE) can perform uplink and downlink communication by simultaneously using a plurality of cells (carriers), to support high-speed data transmission. Among the plurality of cells, one is a primary cell (PCell), and others are secondary cells (SCell).

To further improve the spectral efficiency and the user throughput of the system, a dual connectivity (DC) technology is further introduced into the LTE-A standard by the 3GPP. That is, two base stations can simultaneously provide a data transmission service for one UE. A base station in which the PCell is located is referred to as a master eNodeB (MeNB), and the other base station is referred to as a secondary eNodeB (SeNB). In DC, a plurality of serving cells in the master eNodeB constitute a master cell group (MCG), where the master cell group includes one PCell and one or more optional SCells; and a plurality of serving cells in the secondary eNodeB constitute a secondary cell group (SCG).

For a DC scenario, there are three types of data bearers: an MCG bearer, an SCG bearer, and a split bearer. A specific bearer type is specified during establishment of a data bearer on a network. Data of the MCG bearer can be transmitted using only the serving cells of the master eNodeB, and is encrypted or decrypted by the master eNodeB. Uplink data is sent to a serving gateway (S-GW) using the master eNodeB, and the master eNodeB receives downlink data from the S-GW. Data of the SCG bearer can be transmitted using only the serving cells of the secondary eNodeB, and is encrypted or decrypted by the secondary eNodeB. Uplink data is sent to the S-GW using the secondary eNodeB, and the secondary eNodeB receives downlink data from the S-GW. Data of the split bearer can be transmitted using the serving cells of the master eNodeB and the serving cells of the secondary eNodeB, but can be encrypted or decrypted only by the master eNodeB. Uplink data is sent to the S-GW using the master eNodeB, and the master eNodeB receives downlink data from the S-GW. The master eNodeB and the secondary eNodeB separately allocate a respective logical channel to the split bearer. In other words, one split bearer corresponds to two logical channels, where one is a logical channel allocated by the master eNodeB, and the other is a logical channel allocated by the secondary eNodeB.

When the secondary eNodeB is added for the UE on the network, the master eNodeB derives a new parameter based on a key of the master eNodeB, and sends the new parameter to the secondary eNodeB for use. The master eNodeB simultaneously sends the derived parameter to the UE, and the UE derives a same key based on the derived parameter.

When a PCell of the UE is changed, if data is continuously transmitted in a changing process, there is a problem of a confusion stage of security processing (including encryption processing and decryption processing) of the data of the split bearer. For example, for uplink data, after the UE receives a PCell change message sent by a source master eNodeB, a security key and a security algorithm are changed to a security key and a security algorithm of a target master eNodeB, and the security key and the security algorithm of the target master eNodeB are always used for a subsequent data packet during Packet Data Convergence Protocol (PDCP) layer processing, but the security key and the security algorithm of the source master eNodeB are still used for data packets that are currently being transmitted at a radio link control (RLC) layer and layers below the RLC layer. After sending the PCell change message, the source master eNodeB is uncertain about when the UE can receive the PCell change message. Therefore, an exact moment at which the UE changes the PCell is uncertain. However, for a purpose of uninterrupted data transmission, the data may be transmitted continuously. Therefore, for the split bearer, the source master eNodeB and the target master eNodeB are uncertain about whether a received data packet is encrypted using the key of the source master eNodeB or the key of the target master eNodeB. This is the problem of the confusion stage of data security processing in the PCell changing process. The same problem also exists in downlink data transmission. The UE is uncertain about whether a received data packet is encrypted using the key of the source master eNodeB or the key of the target master eNodeB, and there is a problem of a confusion stage. For data transmission at the confusion stage, decrypted data is incorrect if a receive end performs decryption using an incorrect key.

A same problem of a confusion stage of data security processing also exists in another scenario of a security parameter change (including related security parameters such as a key and an encryption algorithm). For example, for a serving cell change in a single carrier scenario, a security parameter change of UE and a security parameter change of a serving base station are asynchronous. The problem of the confusion stage of security processing also exists if data is continuously transmitted, and consequently decrypted data is also incorrect. The single carrier scenario herein is that the UE is in a single carrier mode, and the UE communicates with a network using only one serving cell.

In addition, to avoid reusing a COUNT value using a same key and radio bearer identity (RB ID), a base station triggers intra-cell handover to update a key. For the purpose of uninterrupted data transmission in a handover process, the problem of a confusion stage of security processing also exists, and consequently decrypted data is also incorrect.

SUMMARY

Embodiments of the present invention provide a data transmission method and an apparatus, to resolve a problem of a confusion stage of security processing during a security parameter change, thereby avoiding incorrect decrypted data.

The embodiments of the present invention may be specifically implemented using the following technical solutions.

According to a first aspect, an embodiment of the present invention provides a data transmission method. The method includes: receiving a first message, where the first message is used to trigger a change of a security parameter of a first bearer, the first bearer is a signaling radio bearer or a data radio bearer, the security parameter includes a key and/or a security algorithm, and the change of the security parameter indicates that the security parameter of the first bearer is changed from a first security parameter to a second security parameter. The method also includes sending a second message, where the second message is used to indicate that the change of the security parameter of the first bearer is completed. The method also includes performing first security processing on uplink data on the first bearer, to obtain second uplink data, where the first security processing includes at least one of integrity protection for data on the signaling radio bearer, encryption processing for the data on the signaling radio bearer, and encryption processing for data on the data radio bearer. The method also includes sending the second uplink data, where the second uplink data includes a first security parameter indication, and the first security parameter indication is used to indicate a security parameter used in the first security processing of the second uplink data.

According to the data transmission method provided in this embodiment of the present invention, the first security parameter indication is introduced into uplink data on the first bearer, and a base station can determine, based on the first security parameter indication in the uplink data, whether the first security processing of the uplink data is performed using the first security parameter or the second security parameter, so as to select a corresponding security parameter to perform second security processing, thereby resolving a problem that decrypted data at the confusion stage is incorrect.

In a possible design, the method further includes: receiving downlink data on the first bearer, where the downlink data is obtained through the first security processing, the downlink data includes a second security parameter indication, and the second security parameter indication is used to indicate a security parameter used in the first security processing of the downlink data; and selecting the security parameter according to the second security parameter indication in the downlink data, and performing second security processing on the downlink data, where the second security processing includes at least one of integrity protection check for data on the signaling radio bearer, decryption processing for the data on the signaling radio bearer, and decryption processing for data on the data radio bearer. According to the design, the second security parameter indication is introduced into the downlink data, and UE can determine, based on the second security parameter indication in the downlink data, whether the first security processing of the data is performed using the first security parameter or the second security parameter, so as to select a corresponding security parameter to perform the second security processing, thereby resolving a problem that decrypted data at a confusion stage is incorrect.

In a possible design, the first message may further include information about a logical channel, the information about the logical channel includes a logical channel identifier, and the logical channel is used to carry data that is on the first bearer and that is obtained through the first security processing using the second security parameter.

In a possible design, the first security parameter indication and the second security parameter indication are logical channel identifiers, and different logical channel identifiers separately correspond to the first security parameter and the second security parameter. Specifically, a logical channel identifier of a first logical channel and a logical channel identifier of a second logical channel correspond to the first security parameter, and a logical channel identifier of a third logical channel and a logical channel identifier of a fourth logical channel correspond to the second security parameter, where the first logical channel and the second logical channel are used to carry data that is on the first bearer and that is obtained through the first security processing using the first security parameter, and the third logical channel and the fourth logical channel are used to carry data that is on the first bearer and that is obtained through the first security processing using the second security parameter; or a logical channel identifier of a fifth logical channel corresponds to the first security parameter, and a logical channel identifier of a sixth logical channel corresponds to the second security parameter, where the fifth logical channel is used to carry data that is on the first bearer and that is obtained through the first security processing using the first security parameter, and the sixth logical channel is used to carry data that is on the first bearer and that is obtained through the first security processing using the second security parameter.

In a possible design, the first security parameter indication and the second security parameter indication are a bit, and a value change of the bit indicates that the security parameter is changed from the first security parameter to the second security parameter.

In a possible design, the performing first security processing on uplink data on the first bearer may specifically include: after the first message is received or after the second message is sent, performing the first security processing on the uplink data using the second security parameter; or before the first message is received or before the second message is sent, performing the first security processing on the uplink data using the first security parameter.

In a possible design, the method further includes: when the second security parameter indication in the downlink data indicates the first security parameter, performing the second security processing on the downlink data using the first security parameter; or when the second security parameter indication in the downlink data indicates the second security parameter, performing the second security processing on the downlink data using the second security parameter.

In a possible design, the first message is from a base station, and the second message is sent to the base station; or the first message is from a source base station, and the second message is sent to a target base station, where the source base station is a base station in which a source primary cell is located, and the target base station is a base station in which a target primary cell is located.

In a possible design, the first message is a primary cell change message or a radio resource control (RRC) connection reconfiguration message.

In a possible design, the second message is a primary cell change complete message or an RRC connection reconfiguration complete message.

According to a second aspect, an embodiment of the present invention provides another data transmission method. The method includes: sending a first message, where the first message is used to trigger a change of a security parameter of a first bearer, the first bearer is a data radio bearer, the security parameter includes a key and/or a security algorithm, and the change of the security parameter indicates that the security parameter of the first bearer is changed from a first security parameter to a second security parameter. The method also includes performing first security processing on downlink data on the first bearer, to obtain second downlink data, where the first security processing includes encryption processing on data on the data radio bearer. The method also includes sending the second downlink data, where the second downlink data includes a second security parameter indication, and the second security parameter indication is used to indicate a security parameter used in the first security processing of the second downlink data.

According to the data transmission method provided in this embodiment of the present invention, the second security parameter indication is introduced into the downlink data on the first bearer, and UE can determine, based on the second security parameter indication in the downlink data, whether the first security processing of the data is performed using the first security parameter or the second security parameter, so as to select a corresponding security parameter to perform second security processing, thereby resolving a problem that decrypted data at a confusion stage is incorrect.

In a possible design, the method further includes: receiving uplink data on the first bearer, where the uplink data is obtained through the first security processing, the uplink data includes a first security parameter indication, and the first security parameter indication is used to indicate a security parameter used in the first security processing of the uplink data; and selecting the security parameter according to the first security parameter indication in the uplink data, and performing second security processing on the uplink data, where the second security processing includes decryption processing on data on the data radio bearer. According to the design, the first security parameter indication is introduced into the uplink data, and a source base station can determine, based on the first security parameter indication in the uplink data, whether the first security processing of the uplink data is performed using the first security parameter or the second security parameter, so as to select a corresponding security parameter to perform the second security processing, thereby resolving a problem that decrypted data at a confusion stage is incorrect.

In a possible design, the first message further includes information about a logical channel, the information about the logical channel includes a logical channel identifier, and the logical channel is used to carry data that is on the first bearer and that is obtained through the first security processing using the second security parameter.

In a possible design, the first security parameter indication and the second security parameter indication may be logical channel identifiers, and different logical channel identifiers separately correspond to the first security parameter and the second security parameter. Specifically, a logical channel identifier of a first logical channel and a logical channel identifier of a second logical channel correspond to the first security parameter, and a logical channel identifier of a third logical channel and a logical channel identifier of a fourth logical channel correspond to the second security parameter, where the first logical channel and the second logical channel are used to carry data that is on the first bearer and that is obtained through the first security processing using the first security parameter, and the third logical channel and the fourth logical channel are used to carry data that is on the first bearer and that is obtained through the first security processing using the second security parameter.

In a possible design, the first security parameter indication and the second security parameter indication may alternatively be a bit, and a value change of the bit indicates that the security parameter is changed from the first security parameter to the second security parameter.

In a possible design, the method further includes: performing the first security processing on the downlink data using the first security parameter.

In a possible design, the method further includes: when the first security parameter indication in the uplink data indicates the first security parameter, performing the second security processing on the uplink data using the first security parameter.

In a possible design, the first message is a primary cell change message or a radio resource control (RRC) connection reconfiguration message.

According to a third aspect, an embodiment of the present invention provides still another data transmission method. The method includes: receiving a second message, where the second message is used to indicate that a change of a security parameter of a first bearer is completed, and the first bearer is a data radio bearer. The method also includes performing first security processing on downlink data on the first bearer, to obtain second downlink data, where the first security processing includes encryption processing on data on the data radio bearer. The method also includes sending the second downlink data, where the second downlink data includes a second security parameter indication, and the second security parameter indication is used to indicate a security parameter used in the first security processing of the second downlink data.

According to the data transmission method provided in this embodiment of the present invention, the second security parameter indication is introduced into the downlink data on the first bearer, and UE can determine, based on the second security parameter indication in the downlink data, whether the first security processing of the data is performed using the first security parameter or the second security parameter, so as to select a corresponding security parameter to perform second security processing, thereby resolving a problem that decrypted data at a confusion stage is incorrect.

In a possible design, the method further includes: receiving uplink data on the first bearer, where the uplink data is obtained through the first security processing, the uplink data includes a first security parameter indication, and the first security parameter indication is used to indicate a security parameter used in the first security processing of the uplink data; and selecting the security parameter according to the first security parameter indication in the uplink data, and performing second security processing on the uplink data, where the second security processing includes decryption processing on data on the data radio bearer. According to the design, the first security parameter indication is introduced into the uplink data, and a target base station can determine, based on the first security parameter indication in the uplink data, whether the first security processing of the uplink data is performed using the first security parameter or the second security parameter, so as to select a corresponding security parameter to perform the second security processing, thereby resolving a problem that decrypted data at a confusion stage is incorrect.

In a possible design, the first security parameter indication and the second security parameter indication may be logical channel identifiers, and different logical channel identifiers separately correspond to the first security parameter and the second security parameter. Specifically, a logical channel identifier of a first logical channel and a logical channel identifier of a second logical channel correspond to the first security parameter, and a logical channel identifier of a third logical channel and a logical channel identifier of a fourth logical channel correspond to the second security parameter, where the first logical channel and the second logical channel are used to carry data that is on the first bearer and that is obtained through the first security processing using the first security parameter, and the third logical channel and the fourth logical channel are used to carry data that is on the first bearer and that is obtained through the first security processing using the second security parameter.

In a possible design, the first security parameter indication and the second security parameter indication may alternatively be a bit, and a value change of the bit indicates that the security parameter is changed from the first security parameter to the second security parameter.

In a possible design, the method further includes: performing the first security processing on the downlink data using the second security parameter.

In a possible design, the method further includes: when the first security parameter indication in the uplink data indicates the second security parameter, performing the second security processing on the uplink data using the second security parameter.

In a possible design, the second message is a primary cell change complete message or an RRC connection reconfiguration complete message.

According to a fourth aspect, an embodiment of the present invention provides still another data transmission method. The method includes: sending a first message, where the first message is used to trigger a change of a security parameter of a first bearer, the first bearer is a signaling radio bearer or a data radio bearer, the security parameter includes a key and/or a security algorithm, and the change of the security parameter indicates that the security parameter of the first bearer is changed from a first security parameter to a second security parameter. The method also includes receiving a second message, where the second message is used to indicate that the change of the security parameter of the first bearer is completed. The method also includes performing first security processing on downlink data on the first bearer, to obtain second downlink data, where the first security processing includes at least one of integrity protection for data on the signaling radio bearer, encryption processing for the data on the signaling radio bearer, and encryption processing for data on the data radio bearer. The method also includes sending the second downlink data, where the second downlink data includes a second security parameter indication, and the second security parameter indication is used to indicate a security parameter used in the first security processing of the second downlink data.

According to the data transmission method provided in this embodiment of the present invention, the second security parameter indication is introduced into the downlink data on the first bearer, and UE can determine, based on the second security parameter indication in the downlink data, whether the first security processing of the data is performed using the first security parameter or the second security parameter, so as to select a corresponding security parameter to perform second security processing, thereby resolving a problem that decrypted data at a confusion stage is incorrect.

In a possible design, the method further includes: receiving uplink data on the first bearer, where the uplink data is obtained through the first security processing, the uplink data includes a first security parameter indication, and the first security parameter indication is used to indicate a security parameter used in the first security processing of the uplink data; and selecting the security parameter according to the first security parameter indication in the uplink data, and performing second security processing on the uplink data, where the second security processing includes at least one of integrity protection check for data on the signaling radio bearer, decryption processing for the data on the signaling radio bearer, and decryption processing for data on the data radio bearer. According to the design, the first security parameter indication is introduced into the uplink data, and a base station can determine, based on the first security parameter indication in the uplink data, whether the first security processing of the uplink data is performed using the first security parameter or the second security parameter, so as to select a corresponding security parameter to perform the second security processing, thereby resolving a problem that decrypted data at a confusion stage is incorrect.

In a possible design, the first message further includes information about a logical channel, the information about the logical channel includes a logical channel identifier, and the logical channel is used to carry data that is on the first bearer and that is obtained through the first security processing using the second security parameter.

In a possible design, the first security parameter indication and the second security parameter indication may be logical channel identifiers, and different logical channel identifiers separately correspond to the first security parameter and the second security parameter. Specifically, a logical channel identifier of a fifth logical channel corresponds to the first security parameter, and a logical channel identifier of a sixth logical channel corresponds to the second security parameter, where the fifth logical channel is used to carry data that is on the first bearer and that is obtained through the first security processing using the first security parameter, and the sixth logical channel is used to carry data that is on the first bearer and that is obtained through the first security processing using the second security parameter.

In a possible design, the first security parameter indication and the second security parameter indication may alternatively be a bit, and a value change of the bit indicates that the security parameter is changed from the first security parameter to the second security parameter.

In a possible design, the method further includes: after the first message is sent or after the second message is received, performing the first security processing on the downlink data using the second security parameter; or before the first message is sent or before the second message is received, performing the first security processing on the downlink data using the first security parameter.

In a possible design, the method further includes: when the first security parameter indication in the uplink data indicates the first security parameter, performing the second security processing on the uplink data using the first security parameter; or when the first security parameter indication in the uplink data indicates the second security parameter, performing the second security processing on the uplink data using the second security parameter.

In a possible design, the first message is a primary cell change message or a radio resource control (RRC) connection reconfiguration message.

In a possible design, the second message is a primary cell change complete message or an RRC connection reconfiguration complete message.

According to a fifth aspect, an embodiment of the present invention provides a user equipment (UE), where the UE includes a receiver, a processor, and a transmitter. The UE implements functions of the UE in the data transmission method in the first aspect. Therefore, the UE can also achieve the beneficial effects of the data transmission method in the first aspect. The functions of the UE may be implemented using hardware, or implemented by executing corresponding software by hardware. The hardware or software includes at least one module corresponding to the foregoing functions.

In a possible design, the receiver is configured to receive a first message, where the first message is used to trigger a change of a security parameter of a first bearer, the first bearer is a signaling radio bearer or a data radio bearer, the security parameter includes a key and/or a security algorithm, and the change of the security parameter indicates that the security parameter of the first bearer is changed from a first security parameter to a second security parameter. The transmitter is configured to send a second message, where the second message is used to indicate that the change of the security parameter of the first bearer is completed. The processor is configured to perform first security processing on uplink data on the first bearer, to obtain second uplink data, where the first security processing includes at least one of integrity protection for data on the signaling radio bearer, encryption processing for the data on the signaling radio bearer, and encryption processing for data on the data radio bearer. The transmitter is further configured to send the second uplink data, where the second uplink data includes a first security parameter indication, and the first security parameter indication is used to indicate a security parameter used in the first security processing of the second uplink data.

In a possible design, the receiver is further configured to receive downlink data on the first bearer, where the downlink data is obtained through the first security processing, the downlink data includes a second security parameter indication, and the second security parameter indication is used to indicate a security parameter used in the first security processing of the downlink data. The processor is further configured to select the security parameter according to the second security parameter indication in the downlink data, and perform second security processing on the downlink data, where the second security processing includes at least one of integrity protection check for data on the signaling radio bearer, decryption processing for the data on the signaling radio bearer, and decryption processing for data on the data radio bearer.

In a possible design, the first message may further include information about a logical channel, the information about the logical channel includes a logical channel identifier, and the logical channel is used to carry data that is on the first bearer and that is obtained through the first security processing using the second security parameter.

In a possible design, the first security parameter indication and the second security parameter indication may be logical channel identifiers, and different logical channel identifiers separately correspond to the first security parameter and the second security parameter. Specifically, a logical channel identifier of a first logical channel and a logical channel identifier of a second logical channel correspond to the first security parameter, and a logical channel identifier of a third logical channel and a logical channel identifier of a fourth logical channel correspond to the second security parameter, where the first logical channel and the second logical channel are used to carry data that is on the first bearer and that is obtained through the first security processing using the first security parameter, and the third logical channel and the fourth logical channel are used to carry data that is on the first bearer and that is obtained through the first security processing using the second security parameter; or a logical channel identifier of a fifth logical channel corresponds to the first security parameter, and a logical channel identifier of a sixth logical channel corresponds to the second security parameter, where the fifth logical channel is used to carry data that is on the first bearer and that is obtained through the first security processing using the first security parameter, and the sixth logical channel is used to carry data that is on the first bearer and that is obtained through the first security processing using the second security parameter.

In a possible design, the first security parameter indication and the second security parameter indication may alternatively be a bit, and a value change of the bit indicates that the security parameter is changed from the first security parameter to the second security parameter.

In a possible design, the processor is further configured to: after the first message is received or after the second message is sent, perform the first security processing on the uplink data using the second security parameter; or before the first message is received or before the second message is sent, perform the first security processing on the uplink data using the first security parameter.

In a possible design, the processor is further configured to: when the second security parameter indication in the downlink data indicates the first security parameter, perform the second security processing on the downlink data using the first security parameter; or when the second security parameter indication in the downlink data indicates the second security parameter, perform the second security processing on the downlink data using the second security parameter.

In a possible design, the first message is from a base station, and the second message is sent to the base station; or the first message is from a source base station, and the second message is sent to a target base station, where the source base station is a base station in which a source primary cell is located, and the target base station is a base station in which a target primary cell is located.

According to a sixth aspect, an embodiment of the present invention provides a user equipment (UE), where the UE includes a receiving unit, a processing unit, and a sending unit. The UE implements functions of the UE in the data transmission method in the first aspect. Therefore, the UE can also achieve the beneficial effects of the data transmission method in the first aspect. The functions of the UE may be implemented using hardware, or implemented by executing corresponding software by hardware. The hardware or software includes at least one module corresponding to the foregoing functions.

In a possible design, the receiving unit is configured to receive a first message, where the first message is used to trigger a change of a security parameter of a first bearer, the first bearer is a signaling radio bearer or a data radio bearer, the security parameter includes a key and/or a security algorithm, and the change of the security parameter indicates that the security parameter of the first bearer is changed from a first security parameter to a second security parameter; the sending unit is configured to send a second message, where the second message is used to indicate that the change of the security parameter of the first bearer is completed; the processing unit is configured to perform first security processing on uplink data on the first bearer, to obtain second uplink data, where the first security processing includes at least one of integrity protection for data on the signaling radio bearer, encryption processing for the data on the signaling radio bearer, and encryption processing for data on the data radio bearer; and the sending unit is further configured to send the second uplink data, where the second uplink data includes a first security parameter indication, and the first security parameter indication is used to indicate a security parameter used in the first security processing of the second uplink data.

In a possible design, the receiving unit is further configured to receive downlink data on the first bearer, where the downlink data is obtained through the first security processing, the downlink data includes a second security parameter indication, and the second security parameter indication is used to indicate a security parameter used in the first security processing of the downlink data; and the processing unit is further configured to select the security parameter according to the second security parameter indication in the downlink data, and perform second security processing on the downlink data, where the second security processing includes at least one of integrity protection check for data on the signaling radio bearer, decryption processing for the data on the signaling radio bearer, and decryption processing for data on the data radio bearer.

In a possible design, the first message may further include information about a logical channel, the information about the logical channel includes a logical channel identifier, and the logical channel is used to carry data that is on the first bearer and that is obtained through the first security processing using the second security parameter.

In a possible design, the first security parameter indication and the second security parameter indication may be logical channel identifiers, and different logical channel identifiers separately correspond to the first security parameter and the second security parameter. Specifically, a logical channel identifier of a first logical channel and a logical channel identifier of a second logical channel correspond to the first security parameter, and a logical channel identifier of a third logical channel and a logical channel identifier of a fourth logical channel correspond to the second security parameter, where the first logical channel and the second logical channel are used to carry data that is on the first bearer and that is obtained through the first security processing using the first security parameter, and the third logical channel and the fourth logical channel are used to carry data that is on the first bearer and that is obtained through the first security processing using the second security parameter; or a logical channel identifier of a fifth logical channel corresponds to the first security parameter, and a logical channel identifier of a sixth logical channel corresponds to the second security parameter, where the fifth logical channel is used to carry data that is on the first bearer and that is obtained through the first security processing using the first security parameter, and the sixth logical channel is used to carry data that is on the first bearer and that is obtained through the first security processing using the second security parameter.

In a possible design, the first security parameter indication and the second security parameter indication may alternatively be a bit, and a value change of the bit indicates that the security parameter is changed from the first security parameter to the second security parameter.

In a possible design, the processing unit is further configured to: after the first message is received or after the second message is sent, perform the first security processing on the uplink data using the second security parameter; or before the first message is received or before the second message is sent, perform the first security processing on the uplink data using the first security parameter.

In a possible design, the processing unit is further configured to: when the second security parameter indication in the downlink data indicates the first security parameter, perform the second security processing on the downlink data using the first security parameter; or when the second security parameter indication in the downlink data indicates the second security parameter, perform the second security processing on the downlink data using the second security parameter.

In a possible design, the first message is from a base station, and the second message is sent to the base station; or the first message is from a source base station, and the second message is sent to a target base station, where the source base station is a base station in which a source primary cell is located, and the target base station is a base station in which a target primary cell is located.

According to a seventh aspect, an embodiment of the present invention provides a base station, where the base station includes a processor and a transmitter, and may further include a receiver. The base station implements functions of the base station in the data transmission method in the second aspect. Therefore, the base station can also achieve the beneficial effects of the data transmission method in the second aspect. The functions of the base station may be implemented using hardware, or implemented by executing corresponding software by hardware. The hardware or software includes at least one module corresponding to the foregoing functions.

In a possible design, the transmitter is configured to send a first message, where the first message is used to trigger a change of a security parameter of a first bearer, the first bearer is a data radio bearer, the security parameter includes a key and/or a security algorithm, and the change of the security parameter indicates that the security parameter of the first bearer is changed from a first security parameter to a second security parameter; the processor is configured to perform first security processing on downlink data on the first bearer, to obtain second downlink data, where the first security processing includes encryption processing on data on the data radio bearer; and the transmitter is further configured to send the second downlink data, where the second downlink data includes a second security parameter indication, and the second security parameter indication is used to indicate a security parameter used in the first security processing of the second downlink data.

In a possible design, the receiver is configured to receive uplink data on the first bearer, where the uplink data is obtained through the first security processing, the uplink data includes a first security parameter indication, and the first security parameter indication is used to indicate a security parameter used in the first security processing of the uplink data; and the processor is further configured to select the security parameter according to the first security parameter indication in the uplink data, and perform second security processing on the uplink data, where the second security processing includes decryption processing on data on the data radio bearer.

In a possible design, the first message may further include information about a logical channel, the information about the logical channel includes a logical channel identifier, and the logical channel is used to carry data that is on the first bearer and that is obtained through the first security processing using the second security parameter.

In a possible design, the first security parameter indication and the second security parameter indication may be logical channel identifiers, and different logical channel identifiers separately correspond to the first security parameter and the second security parameter. Specifically, a logical channel identifier of a first logical channel and a logical channel identifier of a second logical channel correspond to the first security parameter, and a logical channel identifier of a third logical channel and a logical channel identifier of a fourth logical channel correspond to the second security parameter, where the first logical channel and the second logical channel are used to carry data that is on the first bearer and that is obtained through the first security processing using the first security parameter, and the third logical channel and the fourth logical channel are used to carry data that is on the first bearer and that is obtained through the first security processing using the second security parameter.

In a possible design, the first security parameter indication and the second security parameter indication may alternatively be a bit, and a value change of the bit indicates that the security parameter is changed from the first security parameter to the second security parameter.

In a possible design, the processor is further configured to perform the first security processing on the downlink data using the first security parameter.

In a possible design, the processor is further configured to: when the first security parameter indication in the uplink data indicates the first security parameter, perform the second security processing on the uplink data using the first security parameter.

According to an eighth aspect, an embodiment of the present invention provides another base station, where the base station includes a receiver, a processor, and a transmitter. The base station implements functions of the base station in the data transmission method in the third aspect. Therefore, the base station can also achieve the beneficial effects of the data transmission method in the third aspect. The functions of the base station may be implemented using hardware, or implemented by executing corresponding software by hardware. The hardware or software includes at least one module corresponding to the foregoing functions.

In a possible design, the receiver is configured to receive a second message, where the second message is used to indicate that a change of a security parameter of a first bearer is completed, and the first bearer is a data radio bearer; the processor is configured to perform first security processing on downlink data on the first bearer, to obtain second downlink data, where the first security processing includes encryption processing on data on the data radio bearer; and the transmitter is configured to send the second downlink data, where the second downlink data includes a second security parameter indication, and the second security parameter indication is used to indicate a security parameter used in the first security processing of the second downlink data.

In a possible design, the receiver is further configured to receive uplink data on the first bearer, where the uplink data is obtained through the first security processing, the uplink data includes a first security parameter indication, and the first security parameter indication is used to indicate a security parameter used in the first security processing of the uplink data; and the processor is further configured to select the security parameter according to the first security parameter indication in the uplink data, and perform second security processing on the uplink data, where the second security processing includes decryption processing on data on the data radio bearer.

In a possible design, the first security parameter indication and the second security parameter indication may be logical channel identifiers, and different logical channel identifiers separately correspond to the first security parameter and the second security parameter. Specifically, a logical channel identifier of a first logical channel and a logical channel identifier of a second logical channel correspond to the first security parameter, and a logical channel identifier of a third logical channel and a logical channel identifier of a fourth logical channel correspond to the second security parameter, where the first logical channel and the second logical channel are used to carry data that is on the first bearer and that is obtained through the first security processing using the first security parameter, and the third logical channel and the fourth logical channel are used to carry data that is on the first bearer and that is obtained through the first security processing using the second security parameter.

In a possible design, the first security parameter indication and the second security parameter indication may alternatively be a bit, and a value change of the bit indicates that the security parameter is changed from the first security parameter to the second security parameter.

In a possible design, the processor is further configured to perform the first security processing on the downlink data using the second security parameter.

In a possible design, the processor is further configured to: when the first security parameter indication in the uplink data indicates the second security parameter, perform the second security processing on the uplink data using the second security parameter.

According to a ninth aspect, an embodiment of the present invention provides a base station, where the base station includes a receiver, a processor, and a transmitter. The base station implements functions of the base station in the data transmission method in the fourth aspect. Therefore, the base station can also achieve the beneficial effects of the data transmission method in the fourth aspect. The functions of the base station may be implemented using hardware, or implemented by executing corresponding software by hardware. The hardware or software includes at least one module corresponding to the foregoing functions.

In a possible design, the transmitter is configured to send a first message, where the first message is used to trigger a change of a security parameter of a first bearer, the first bearer is a signaling radio bearer or a data radio bearer, the security parameter includes a key and/or a security algorithm, and the change of the security parameter indicates that the security parameter of the first bearer is changed from a first security parameter to a second security parameter; the receiver is configured to receive a second message, where the second message is used to indicate that the change of the security parameter of the first bearer is completed; the processor is configured to perform first security processing on downlink data on the first bearer, to obtain second downlink data, where the first security processing includes at least one of integrity protection for data on the signaling radio bearer, encryption processing for the data on the signaling radio bearer, and encryption processing for data on the data radio bearer; and the transmitter is further configured to send the second downlink data, where the second downlink data includes a second security parameter indication, and the second security parameter indication is used to indicate a security parameter used in the first security processing of the second downlink data.

In a possible design, the receiver is further configured to receive uplink data on the first bearer, where the uplink data is obtained through the first security processing, the uplink data includes a first security parameter indication, and the first security parameter indication is used to indicate a security parameter used in the first security processing of the uplink data; and the processor is further configured to select the security parameter according to the first security parameter indication in the uplink data, and perform second security processing on the uplink data, where the second security processing includes at least one of integrity protection check for data on the signaling radio bearer, decryption processing for the data on the signaling radio bearer, and decryption processing for data on the data radio bearer.

In a possible design, the first message may further include information about a logical channel, the information about the logical channel includes a logical channel identifier, and the logical channel is used to carry data that is on the first bearer and that is obtained through the first security processing using the second security parameter.

In a possible design, the first security parameter indication and the second security parameter indication may be logical channel identifiers, and different logical channel identifiers separately correspond to the first security parameter and the second security parameter. Specifically, a logical channel identifier of a fifth logical channel corresponds to the first security parameter, and a logical channel identifier of a sixth logical channel corresponds to the second security parameter, where the fifth logical channel is used to carry data that is on the first bearer and that is obtained through the first security processing using the first security parameter, and the sixth logical channel is used to carry data that is on the first bearer and that is obtained through the first security processing using the second security parameter.

In a possible design, the first security parameter indication and the second security parameter indication may alternatively be a bit, and a value change of the bit indicates that the security parameter is changed from the first security parameter to the second security parameter.

In a possible design, the processor is further configured to: after the first message is sent or after the second message is received, perform the first security processing on the downlink data using the second security parameter; or before the first message is sent or before the second message is received, perform the first security processing on the downlink data using the first security parameter.

In a possible design, the processor is further configured to: when the first security parameter indication in the uplink data indicates the first security parameter, perform the second security processing on the uplink data using the first security parameter; or when the first security parameter indication in the uplink data indicates the second security parameter, perform the second security processing on the uplink data using the second security parameter.

According to a tenth aspect, an embodiment of the present invention provides a base station, where the base station includes a processing unit and a sending unit, and may further include a receiving unit. The base station implements functions of the base station in the data transmission method in the second aspect. Therefore, the base station can also achieve the beneficial effects of the data transmission method in the second aspect. The functions of the base station may be implemented using hardware, or implemented by executing corresponding software by hardware. The hardware or software includes at least one module corresponding to the foregoing functions.

In a possible design, the sending unit is configured to send a first message, where the first message is used to trigger a change of a security parameter of a first bearer, the first bearer is a data radio bearer, the security parameter includes a key and/or a security algorithm, and the change of the security parameter indicates that the security parameter of the first bearer is changed from a first security parameter to a second security parameter; the processing unit is configured to perform first security processing on downlink data on the first bearer, to obtain second downlink data, where the first security processing includes encryption processing on data on the data radio bearer; and the sending unit is further configured to send the second downlink data, where the second downlink data includes a second security parameter indication, and the second security parameter indication is used to indicate a security parameter used in the first security processing of the second downlink data.

In a possible design, the receiving unit is configured to receive uplink data on the first bearer, where the uplink data is obtained through the first security processing, the uplink data includes a first security parameter indication, and the first security parameter indication is used to indicate a security parameter used in the first security processing of the uplink data; and the processing unit is further configured to select the security parameter according to the first security parameter indication in the uplink data, and perform second security processing on the uplink data, where the second security processing includes decryption processing on data on the data radio bearer.

In a possible design, the first message may further include information about a logical channel, the information about the logical channel includes a logical channel identifier, and the logical channel is used to carry data that is on the first bearer and that is obtained through the first security processing using the second security parameter.

In a possible design, the first security parameter indication and the second security parameter indication may be logical channel identifiers, and different logical channel identifiers separately correspond to the first security parameter and the second security parameter. Specifically, a logical channel identifier of a first logical channel and a logical channel identifier of a second logical channel correspond to the first security parameter, and a logical channel identifier of a third logical channel and a logical channel identifier of a fourth logical channel correspond to the second security parameter, where the first logical channel and the second logical channel are used to carry data that is on the first bearer and that is obtained through the first security processing using the first security parameter, and the third logical channel and the fourth logical channel are used to carry data that is on the first bearer and that is obtained through the first security processing using the second security parameter.

In a possible design, the first security parameter indication and the second security parameter indication may alternatively be a bit, and a value change of the bit indicates that the security parameter is changed from the first security parameter to the second security parameter.

In a possible design, the processing unit is further configured to perform the first security processing on the downlink data using the first security parameter.

In a possible design, the processing unit is further configured to: when the first security parameter indication in the uplink data indicates the first security parameter, perform the second security processing on the uplink data using the first security parameter.

According to an eleventh aspect, an embodiment of the present invention provides a base station. The base station includes a receiving unit, a processing unit, and a sending unit. The base station implements functions of the base station in the data transmission method in the third aspect. Therefore, the base station can also achieve the beneficial effects of the data transmission method in the third aspect. The functions of the base station may be implemented using hardware, or implemented by executing corresponding software by hardware. The hardware or software includes at least one module corresponding to the foregoing functions.

In a possible design, the receiving unit is configured to receive a second message, where the second message is used to indicate that a change of a security parameter of a first bearer is completed, and the first bearer is a data radio bearer; the processing unit is configured to perform first security processing on downlink data on the first bearer, to obtain second downlink data, where the first security processing includes encryption processing on data on the data radio bearer; and the sending unit is configured to send the second downlink data, where the second downlink data includes a second security parameter indication, and the second security parameter indication is used to indicate a security parameter used in the first security processing of the second downlink data.

In a possible design, the receiving unit is further configured to receive uplink data on the first bearer, where the uplink data is obtained through the first security processing, the uplink data includes a first security parameter indication, and the first security parameter indication is used to indicate a security parameter used in the first security processing of the uplink data; and the processing unit is further configured to select the security parameter according to the first security parameter indication in the uplink data, and perform second security processing on the uplink data, where the second security processing includes decryption processing on data on the data radio bearer.

In a possible design, the first security parameter indication and the second security parameter indication may be logical channel identifiers, and different logical channel identifiers separately correspond to the first security parameter and the second security parameter. Specifically, a logical channel identifier of a first logical channel and a logical channel identifier of a second logical channel correspond to the first security parameter, and a logical channel identifier of a third logical channel and a logical channel identifier of a fourth logical channel correspond to the second security parameter, where the first logical channel and the second logical channel are used to carry data that is on the first bearer and that is obtained through the first security processing using the first security parameter, and the third logical channel and the fourth logical channel are used to carry data that is on the first bearer and that is obtained through the first security processing using the second security parameter.

In a possible design, the first security parameter indication and the second security parameter indication may alternatively be a bit, and a value change of the bit indicates that the security parameter is changed from the first security parameter to the second security parameter.

In a possible design, the processing unit is further configured to perform the first security processing on the downlink data using the second security parameter.

In a possible design, the processing unit is further configured to: when the first security parameter indication in the uplink data indicates the second security parameter, perform the second security processing on the uplink data using the second security parameter.

According to a twelfth aspect, an embodiment of the present invention provides a base station, where the base station includes a receiving unit, a processing unit, and a sending unit. The base station implements functions of the base station in the data transmission method in the fourth aspect. Therefore, the base station can also achieve the beneficial effects of the data transmission method in the fourth aspect. The functions of the base station may be implemented using hardware, or implemented by executing corresponding software by hardware. The hardware or software includes at least one module corresponding to the foregoing functions.

In a possible design, the sending unit is configured to send a first message, where the first message is used to trigger a change of a security parameter of a first bearer, the first bearer is a signaling radio bearer or a data radio bearer, the security parameter includes a key and/or a security algorithm, and the change of the security parameter indicates that the security parameter of the first bearer is changed from a first security parameter to a second security parameter; the receiving unit is configured to receive a second message, where the second message is used to indicate that the change of the security parameter of the first bearer is completed; the processing unit is configured to perform first security processing on downlink data on the first bearer, to obtain second downlink data, where the first security processing includes at least one of integrity protection for data on the signaling radio bearer, encryption processing for the data on the signaling radio bearer, and encryption processing for data on the data radio bearer; and the sending unit is further configured to send the second downlink data, where the second downlink data includes a second security parameter indication, and the second security parameter indication is used to indicate a security parameter used in the first security processing of the second downlink data.

In a possible design, the receiving unit is further configured to receive uplink data on the first bearer, where the uplink data is obtained through the first security processing, the uplink data includes a first security parameter indication, and the first security parameter indication is used to indicate a security parameter used in the first security processing of the uplink data. The processing unit is further configured to select the security parameter according to the first security parameter indication in the uplink data, and perform second security processing on the uplink data, where the second security processing includes at least one of integrity protection check for data on the signaling radio bearer, decryption processing for the data on the signaling radio bearer, and decryption processing for data on the data radio bearer.

In a possible design, the first message may further include information about a logical channel, the information about the logical channel includes a logical channel identifier, and the logical channel is used to carry data that is on the first bearer and that is obtained through the first security processing using the second security parameter.

In a possible design, the first security parameter indication and the second security parameter indication may be logical channel identifiers, and different logical channel identifiers separately correspond to the first security parameter and the second security parameter. Specifically, a logical channel identifier of a fifth logical channel corresponds to the first security parameter, and a logical channel identifier of a sixth logical channel corresponds to the second security parameter, where the fifth logical channel is used to carry data that is on the first bearer and that is obtained through the first security processing using the first security parameter, and the sixth logical channel is used to carry data that is on the first bearer and that is obtained through the first security processing using the second security parameter.

In a possible design, the first security parameter indication and the second security parameter indication may alternatively be a bit, and a value change of the bit indicates that the security parameter is changed from the first security parameter to the second security parameter.

In a possible design, the processing unit is further configured to: after the first message is sent or after the second message is received, perform the first security processing on the downlink data using the second security parameter; or before the first message is sent or before the second message is received, perform the first security processing on the downlink data using the first security parameter.

In a possible design, the processing unit is further configured to: when the first security parameter indication in the uplink data indicates the first security parameter, perform the second security processing on the uplink data using the first security parameter; or when the first security parameter indication in the uplink data indicates the second security parameter, perform the second security processing on the uplink data using the second security parameter.

According to the data transmission method and the apparatus provided in the embodiments of the present invention, the first security parameter indication is introduced into the uplink data on the first bearer, and the base station can determine, based on the first security parameter indication in the uplink data, whether the first security processing of the uplink data is performed using the first security parameter or the second security parameter, so as to select a corresponding security parameter to perform the second security processing, thereby resolving a problem that decrypted data at the confusion stage is incorrect; and the second security parameter indication is introduced into the downlink data, and the UE can determine, based on the second security parameter indication in the downlink data, whether the first security processing of the data is performed using the first security parameter or the second security parameter, so as to select a corresponding security parameter to perform the second security processing, thereby resolving a problem that decrypted data at the confusion stage is incorrect.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

To make the objectives, technical solutions, and advantages of the present application clearer, the following further describes the implementations of the present application in detail with reference to the accompanying drawings. All other embodiments obtained by a person of ordinary skill in the art without creative efforts shall fall within the protection scope of the present application.

Figure 1:
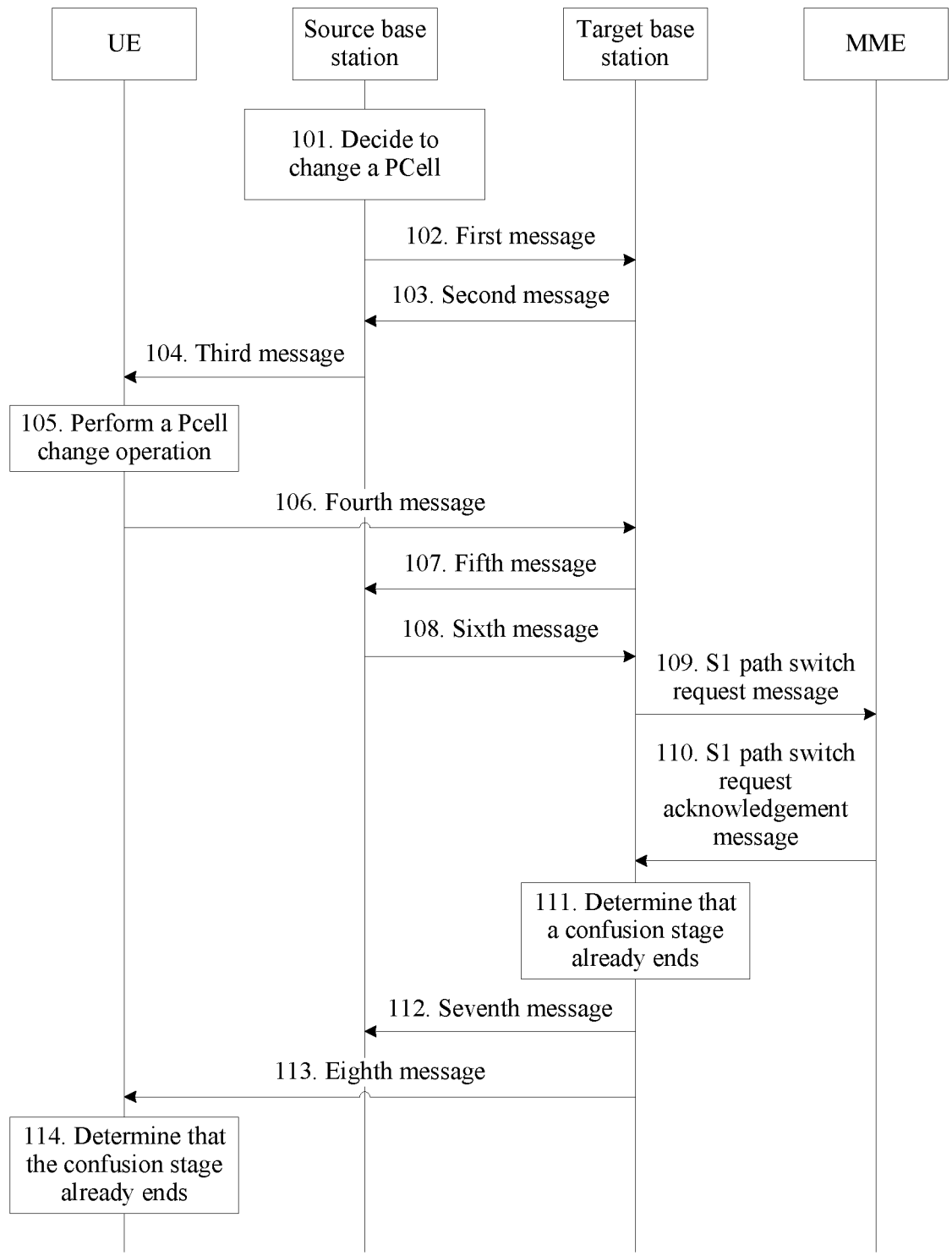
FIG. 1 is a schematic diagram of a possible control plane process of a security parameter change in a PCell changing process between base stations according to an embodiment of the present invention.

FIG. 1 is a schematic diagram of a possible control plane process of a security parameter change in a primary cell (PCell) changing process between base stations according to an embodiment of the present invention.

In this embodiment of the present invention, user equipment (UE) may be referred to as a terminal, a mobile station (MS), a mobile terminal, or the like. The user equipment may communicate with one or more core networks using a radio access network (RAN). For example, the user equipment may be a mobile phone (or referred to as a "cellular phone") or a computer with a mobile terminal. For example, the user equipment may be a portable, pocket-sized, handheld, computer built-in, or in-vehicle mobile apparatus, which exchanges voice and/or data with the radio access network.

101. A source base station decides to change a PCell for UE, and determines a target PCell of the PCell change. The source base station is a base station in which a source PCell is located, and the source PCell is a PCell that provides a service for the UE before the PCell change. In this embodiment of the present invention, the source base station may alternatively be referred to as a source master eNodeB (MeNB).

Optionally, the source base station allocates a third logical channel to a split bearer of the UE. The third logical channel corresponds to a unique logical channel identifier LCID3, and the third logical channel is used to transmit downlink data on the split bearer that is sent to the UE using an air interface of the source base station after the PCell change is completed, and uplink data that is received by the source base station from the UE using the air interface after the PCell change is completed. Before deciding to change a PCell of the UE, the source base station has established a first logical channel for the split bearer. The first logical channel corresponds to a logical channel identifier LCID1. The first logical channel is used to transmit downlink data on the split bearer that is sent to the UE using the air interface of the source base station before the PCell change is completed, and uplink data that is received by the source base station from the UE using the air interface before the PCell change is completed.

If the UE has a plurality of split bearers, the source base station allocates a new logical channel to each split bearer of the UE. For ease of description, this embodiment of the present invention is described by assuming that the UE has only one split bearer.

102. The source base station sends a first message to a target base station, where the first message is used to indicate the PCell change, and the target base station is a base station in which the target PCell is located. In this embodiment of the present invention, the target base station may alternatively be referred to as a target master eNodeB. The first message includes information about the target PCell, for example, a cell identity or a cell index of the target PCell.

Optionally, the first message further includes first GPRS Tunneling Protocol (GTP) tunnel information of the split bearer. A corresponding GTP tunnel identifier is GTP1, and a corresponding GTP tunnel is used to transmit downlink data that is obtained through first security processing by the target base station after S1 path switching and that is sent by the target base station to the source base station. The downlink data needs to be sent to the UE using the air interface of the source base station, and the first security processing includes encryption processing on data on the split bearer.

Optionally, after receiving the first message, the target base station allocates a fourth logical channel to the split bearer of the UE. The fourth logical channel corresponds to a logical channel identifier LCID4, and is used to transmit downlink data on the split bearer that is sent to the UE using an air interface of the target base station after the PCell change is completed and uplink data that is received by the target base station from the UE using the air interface after the PCell change is completed. Before the source base station decides to change the PCell of the UE, the target base station has established a second logical channel for the split bearer. The second logical channel corresponds to a logical channel identifier LCID2, and is used to transmit downlink data on the split bearer that is sent to the UE using the air interface of the target base station before the PCell change is completed and uplink data that is received by the target base station from the UE using the air interface before the PCell change is completed.

Optionally, during initial establishment of dual connectivity (DC) of the UE, a fourth GTP tunnel has been established between the source base station and the target base station. A corresponding GTP tunnel identifier is GTP4, and the fourth GTP tunnel is used to transmit uplink data that is sent by the target base station to the source base station. The uplink data is received by the target base station from the air interface. The source base station performs second security processing on the uplink data, where the second security processing includes decryption processing on the data on the split bearer.

103. The target base station sends a second message to the source base station, where the second message is used to confirm the first message sent by the source base station to the target base station. The second message includes a bearer identifier of the split bearer, and the second message may further include the logical channel identifier LCID4 of the fourth logical channel corresponding to the split bearer.

Optionally, the second message includes second GTP tunnel information of the split bearer. A corresponding GTP tunnel identifier is GTP2, and a corresponding GTP tunnel is used to transmit uplink data that is obtained through the second security processing by the source base station after S1 path switching and that is sent by the source base station to the target base station, and the target base station sends the uplink data to a serving gateway (S-GW).

Optionally, the second message includes third GTP tunnel information of the split bearer. A corresponding GTP tunnel identifier is GTP3, and a corresponding GTP tunnel is used to transmit uplink data that is sent by the source base station to the target base station after S1 path switching, and the target base station performs the second security processing on the uplink data and sends processed data to the S-GW.

104. The source base station sends a third message to the UE, where the third message is used to trigger the PCell change, or may be used to trigger a security parameter change, and the change of the security parameter indicates that a security parameter of the split bearer is changed from a first security parameter to a second security parameter. The third message includes the information about the target PCell, and the third message may further include the bearer identifier of the split bearer and information about a logical channel, where the information about the logical channel includes a logical channel identifier, and the logical channel is newly added and is used to carry data that is on the split bearer and that is obtained through the first security processing using the second security parameter. The first security parameter includes a key of the source base station and/or a security algorithm of the source base station, and the first security parameter is a security parameter that is used to perform the first security processing and the second security processing on data on the split bearer before the security parameter change. The second security parameter includes a key of the target base station and/or a security algorithm of the target base station, and the second security parameter is a security parameter that is used to perform the first security processing and the second security processing on data on the split bearer after the security parameter change.

Specifically, the third message may include information about the third logical channel and information about the fourth logical channel. Therefore, the UE can learn that the split bearer corresponds to four logical channels, where the first logical channel and the second logical channel are established before the third message is received, and are used to carry data that is on the split bearer and that is obtained through the first security processing using the first security parameter; and the third logical channel and the fourth logical channel are established after the third message is received, and are used to carry data that is on the split bearer and that is obtained through the first security processing using the second security parameter.

The third message may be a PCell change message or an RRC connection reconfiguration message including a PCell change indication, to instruct the UE to change the PCell in a manner of modification rather than handover. Specifically, changing the PCell in a manner of modification includes that, a wireless connection between the UE and the source PCell and a wireless connection between the UE and the target PCell are kept uninterrupted in a PCell changing process, and the source base station and the target base station can perform scheduling on data of the UE in the PCell changing process. It can be understood that the third message may alternatively be another type of message, and the present application imposes no limitation thereto.

105. The UE changes the PCell and the security parameter according to the third message received from the source base station. The PCell change includes changing the target PCell to the PCell of the UE and changing the source PCell to an activated-state secondary cell SCell of the UE.

The PCell change further includes changing, by the UE, the source base station to a secondary eNodeB (SeNB), and changing the target base station to a master eNodeB.

Figure 2:
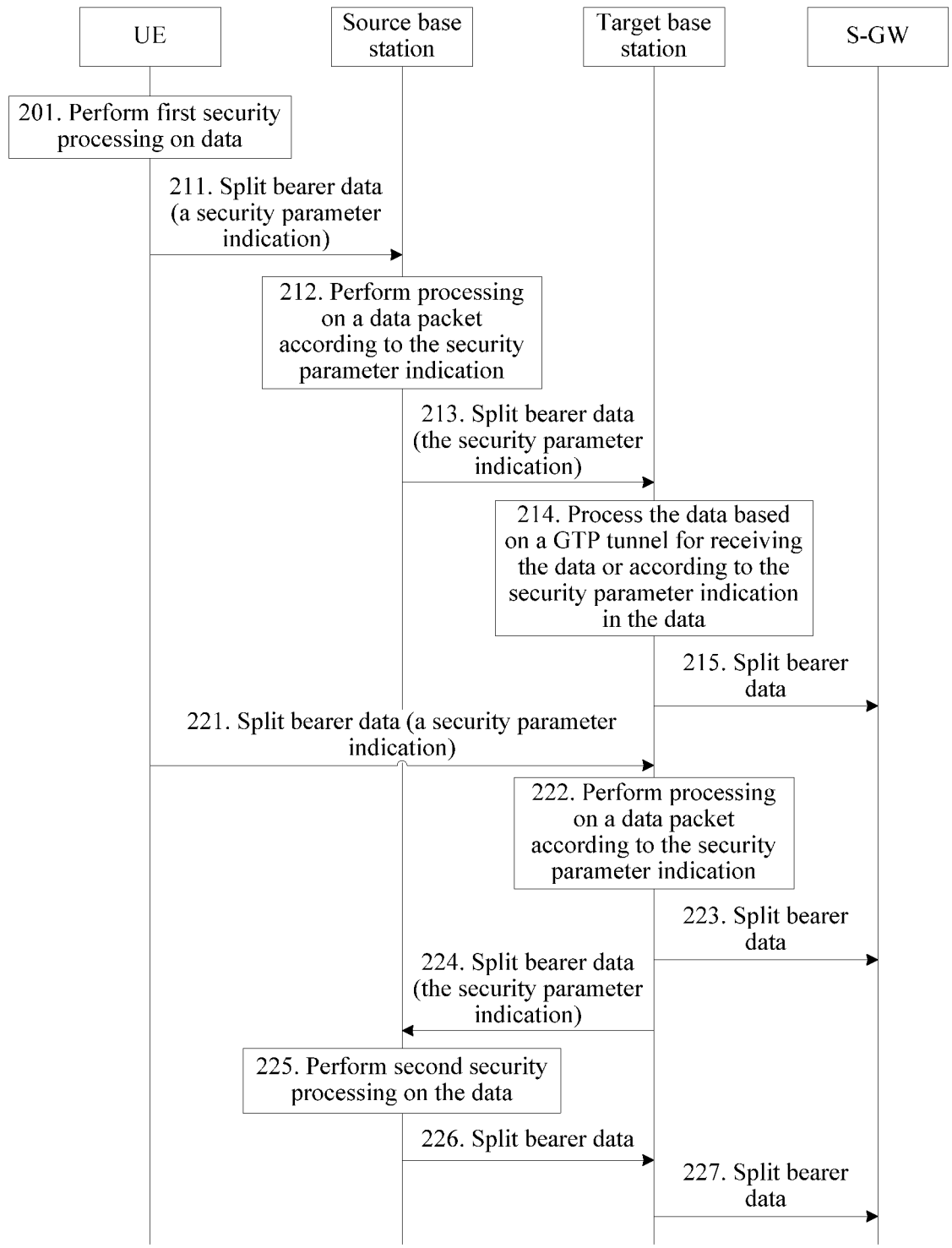
FIG. 2 is a schematic diagram of a possible uplink data transmission process of a split bearer according to an embodiment of the present invention.
Figure 3:
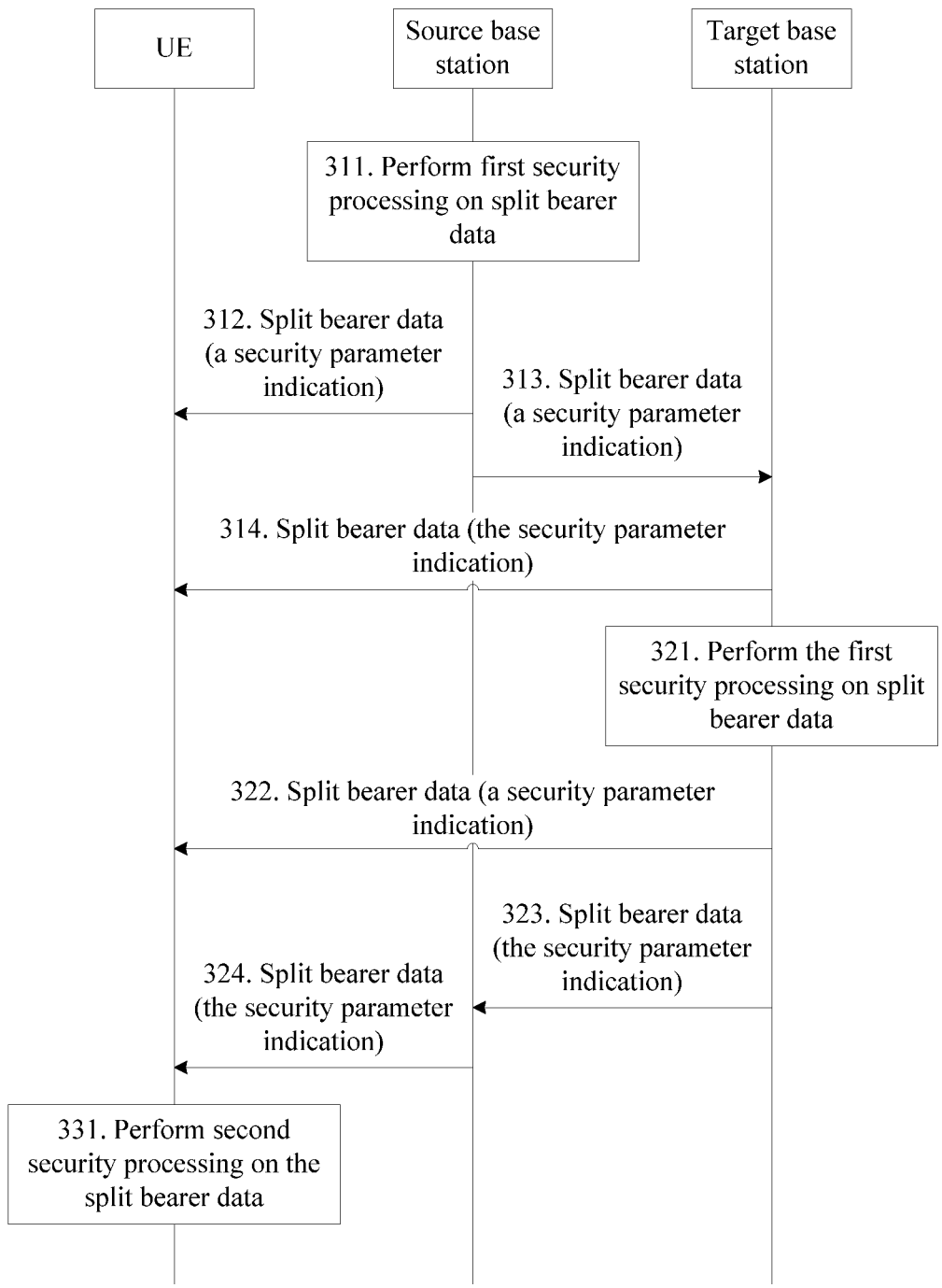
FIG. 3 is a schematic diagram of a possible downlink data transmission process of a split bearer according to an embodiment of the present invention.

Specifically, refer to description of embodiments in FIG. 2 and FIG. 3 for data plane processing of the security parameter change.

106. The UE sends a fourth message to the target base station, where the fourth message is used to indicate that the PCell change is completed, and may also be used to indicate that the security parameter change of the split bearer is completed. The fourth message may include a first COUNT value, and the first COUNT value is a start COUNT value of uplink data obtained through the first security processing by the UE using the second security parameter.

The fourth message may be a new message, for example, a PCell change complete message or an RRC connection reconfiguration complete message, and is used to indicate that a PCell change operation of the UE is completed.

107. After receiving the fourth message sent by the UE, the target base station sends a fifth message to the source base station, where the fifth message is used to indicate that the PCell change is completed or is used to request a sequence number (SN) status. The requesting an SN status includes requesting an uplink Packet Data Convergence Protocol (PDCP) SN receiver status and a downlink PDCP SN transmitter status from the source base station.

108. After receiving the fifth message sent by the target base station, the source base station sends a sixth message to the target base station, where the sixth message is used for SN status transfer, and the sixth message includes the uplink PDCP SN receiver status and the downlink PDCP SN transmitter status.

Further, the uplink PDCP SN receiver status may include at least one of a second COUNT value and a receiver status of a corresponding PDCP receiving window, where the second COUNT value is a count COUNT value of a first piece of PDCP data that is not received by the source base station; and the downlink PDCP SN transmitter status may include at least one of a third COUNT value and a transmitter status of a corresponding PDCP sending window, where the third COUNT value is a start COUNT value that is allocated by the target base station to downlink data to which a sequence number has not been allocated (that is, a COUNT value from which the target base station starts to allocate a sequence number).

Optionally, after receiving the fifth message, the source base station stops allocating a PDCP sequence number to data on the split bearer.

Optionally, the source base station sends received uplink data to the target base station, and sends, to the target base station, downlink data to which a sequence number has been allocated and that has not been successfully transmitted to the UE and downlink data that is received from the serving gateway and to which a sequence number has not been allocated.

109. The target base station sends an S1 path switch request message to a mobility management entity (MME), to request the MME to switch an S1-MME interface and an S1-U path of the split bearer to the target base station, so that the target base station becomes a new master eNodeB. Subsequently, the MME sends S1 signaling to the new master eNodeB, and the S-GW sends downlink data on the split bearer to the new master eNodeB.

110. The MME sends an S1 path switch request acknowledgement message to the target base station, to confirm the S1 path switch request message.

This embodiment of the present invention imposes no limitation on an execution sequence of 107 and 109.

111. The target base station determines that a confusion stage of data transmission of the split bearer already ends, and deletes a second logical channel.

Specifically, the target base station separately determines whether a confusion stage of uplink data transmission and a confusion stage of downlink data transmission of the split bearer already end, and if both the confusion stage of uplink data transmission and the confusion stage of downlink data transmission already end, the target base station considers that the confusion stage of data transmission of the split bearer already ends.

Specifically, if the target base station determines that all data that is of downlink data on the split bearer and that has a COUNT value prior to the third COUNT value is successfully received by the UE, the target base station considers that the confusion stage of downlink data transmission of the split bearer already ends.

Specifically, if the target base station determines that all data that is of uplink data on the split bearer and that has a COUNT value prior to the first COUNT value is successfully received by the target base station, the target base station considers that the confusion stage of uplink data transmission of the split bearer already ends. If the fourth message does not include the first COUNT value, the first COUNT value is a COUNT value of a first uplink data packet that is received by the target base station and that is obtained through the first security processing using the second security parameter. It can be understood that the uplink data may be received using the air interface of the source base station, and then be sent to the target base station.

112. Optionally, the target base station sends a seventh message to the source base station, where the seventh message is used to indicate that the confusion stage ends or to instruct to delete an old logical channel, and the seventh message includes the bearer identifier of the split bearer.

After receiving the seventh message, the source base station deletes the first logical channel.

113. Optionally, the target base station sends an eighth message to the UE, where the eighth message is used to indicate that the confusion stage ends or to instruct to delete an old logical channel, and the eighth message includes the bearer identifier of the split bearer.

After receiving the eighth message, the UE deletes the first logical channel and the second logical channel.

114. Optionally, the UE determines that the confusion stage of data transmission of the split bearer already ends, and deletes the first logical channel and the second logical channel.

Specifically, the UE separately determines whether the confusion stage of uplink data transmission and the confusion stage of downlink data transmission of the split bearer already end, and if both the confusion stage of uplink data transmission and the confusion stage of downlink data transmission already end, the UE considers that the confusion stage of data transmission of the split bearer already ends.

Specifically, the UE records, as a fourth COUNT value, a COUNT value of a first piece of received PDCP data that is on the split bearer and that is obtained through processing using the second security parameter. If the UE determines that all data that is of downlink data on the split bearer and that has a COUNT value prior to the fourth COUNT value is successfully received by the UE, the UE considers that the confusion stage of downlink data transmission of the split bearer already ends.

Specifically, if the UE determines that all data that is of uplink data on the split bearer and that has a COUNT value prior to the first COUNT value is successfully received by the target base station, the UE considers that the confusion stage of uplink data transmission of the split bearer already ends. It can be understood that the uplink data may be received using the air interface of the source base station, and then be sent to the target base station.

This embodiment of the present invention imposes no limitation on an execution sequence of 112 and 113 or an execution sequence of 111 and 114.

The method of this embodiment shown in FIG. 1 is described using dual connectivity (DC) as an example, but this does not limit a scenario to which the embodiment is applicable. The method in this embodiment is also applicable to a single carrier scenario and a carrier aggregation (CA) scenario. For the single carrier scenario or the CA scenario, when the UE performs a serving cell update or a PCell update between base stations occurs because of mobility, a target base station is first added as a secondary eNodeB of the UE on a network, and therefore a current serving base station becomes a master eNodeB. Correspondingly, a DC mode is configured for the UE, and the scenario of the UE becomes a DC scenario.

In this embodiment, for data that is on a same bearer and that is transmitted between UE and a base station, if at least two groups of security parameters are simultaneously used in a period of time, each group of security parameters may correspond to a logical channel identifier (LCID). If a transmitter performs the first security processing using a group of security parameters, an LCID corresponding to the group of security parameters is included in the data. Correspondingly, a receiver can determine, based on the LCID in the data, the security parameters used by the transmitter, and the receiver performs the second security processing using the security parameters, thereby resolving a problem that decrypted data at a confusion stage is incorrect.

FIG. 2 is a schematic diagram of a possible uplink data transmission process of a split bearer according to an embodiment of the present invention.

201. UE performs first security processing on uplink data on a split bearer, to obtain second uplink data.

Specifically, after a security parameter switching time point, the first security processing is performed on the uplink data using a second security parameter; and before the security parameter switching time point, the first security processing is performed on the uplink data using a first security parameter. The security parameter switching time point may be a time point at which the UE receives a third message, or a time point at which the UE sends a fourth message, or a specific time point determined by the UE.

Optionally, the UE splits the second uplink data, where one part of the data is sent to a source base station using an air interface; and the other part of the data is sent to a target base station using an air interface.

211. The UE sends the second uplink data to a source base station.

The second uplink data includes a first security parameter indication, and the first security parameter indication is used to indicate whether a security parameter used in the first security processing of the second uplink data is the first security parameter or the second security parameter. The first security processing includes encryption processing on data on the split bearer. The first security parameter includes a key of the source base station and/or a security algorithm of the source base station, and the second security parameter includes a key of the target base station and/or a security algorithm of the target base station.

Specifically, the first security parameter indication may be a logical channel identifier, and different logical channel identifiers separately correspond to the first security parameter and the second security parameter. Specifically, the logical channel identifier may be LCID1 or LCID3, where LCID1 indicates the first security parameter, and LCID3 indicates the second security parameter. When the first security parameter indication is a logical channel identifier, the second uplink data may be carried on a logical channel corresponding to the logical channel identifier.

The first security parameter indication may alternatively be a new information element in a packet header of a PDCP data packet. Content of the information element may be an identifier or an index of a base station that performs security protection; or may be a fixed bit or a cyclic change of a plurality of bits, and a value change of the bit indicates that a security parameter is changed from the first security parameter to the second security parameter. If content of the first security parameter indication is a base station identifier or a base station index of the source base station, it indicates that the first security parameter indication indicates the first security parameter; or if content of the first security parameter indication is a base station identifier or a base station index of the target base station, it indicates that the first security parameter indication indicates the second security parameter. If the content of the first security parameter indication is a bit or a cyclic change of a plurality of bits, using one bit as an example, assuming that a value of the first security parameter indication is 0 before a PCell changing process, and turns to 1 after the PCell changing process starts, 0 represents that the first security parameter indication indicates the first security parameter, and 1 represents that the first security parameter indication indicates the second security parameter; on the contrary, assuming that a value of the first security parameter indication is 1 before the PCell changing process, and turns to 0 after the PCell changing process starts, 1 represents that the first security parameter indication indicates the first security parameter, and 0 represents that the first security parameter indication indicates the second security parameter. It can be understood that, whether a value of the bit is changed is determined depending on a value of the bit before a PCell change.

212. The source base station selects a security parameter according to the first security parameter indication in the second uplink data, and performs second security processing on the second uplink data. The second security processing includes decryption processing on the data on the split bearer, and the data on the split bearer herein is the second uplink data.

Specifically, when the first security parameter indication in the second uplink data indicates the first security parameter, the source base station performs the second security processing on the second uplink data using the first security parameter; or when the first security parameter indication in the second uplink data indicates the second security parameter, the second uplink data needs to be forwarded to the target base station for the second security processing, and the source base station does not perform the second security processing on the second uplink data.

Refer to description of 211 for how to specifically determine whether the first security parameter indication in the second uplink data indicates the first security parameter or the second security parameter.

213. The source base station sends split bearer data to a target base station, where the split bearer data is data that is obtained through the second security processing by the source base station or data on which the second security processing is not performed by the source base station and that needs to be forwarded to the target base station for the second security processing.

Optionally, the split bearer data includes the first security parameter indication, used to indicate whether the first security processing of the data is performed using the first security parameter or the second security parameter. Refer to description of 211 for the first security parameter indication.

When the first security parameter indication selected in 211 is a logical channel identifier, the source base station may alternatively send the split bearer data to the target base station using different GTP tunnels. Specifically, data with a logical channel identifier of LCID1 is transmitted on a second GTP tunnel; and data with a logical channel identifier of LCID3 is transmitted on a third GTP tunnel.

214. The target base station processes, based on a GTP tunnel for receiving the data or according to the first security parameter indication in the data, the data that is from the source base station.

Specifically, when the source base station sends the split bearer data to the target base station using different GTP tunnels, the source base station has performed the second security processing on the data that is from the second GTP tunnel, and the target base station sends the data to an S-GW; and for the data that is from the third GTP tunnel, the target base station performs the second security processing on the data using the second security parameter, and then sends processed data to the S-GW.

Optionally, the target base station may further select a security parameter according to the first security parameter indication in the data, and perform the second security processing on the data. Specifically, when the first security parameter indication in the data indicates the first security parameter, the source base station has performed the second security processing on the data, and the target base station does not need to perform the second security processing on the data again; or when the first security parameter indication in the data indicates the second security parameter, the target base station performs the second security processing on the data using the second security parameter. Refer to description of 211 for how to specifically determine whether the first security parameter indication in the data indicates the first security parameter or the second security parameter.

215. The target base station sends, to an S-GW, data that has undergone processing of 214. It can be understood that PDCP header information needs to be removed before the data is sent to the S-GW, and the data is encapsulated in an S1 interface data format.

221. The UE sends the second uplink data to the target base station.

The second uplink data includes a first security parameter indication. Specifically, when the first security parameter indication is a logical channel identifier, the logical channel identifier may be LCID2 or LCID4, where LCID2 indicates the first security parameter, and LCID4 indicates the second security parameter, and the second uplink data is carried on a logical channel corresponding to the logical channel identifier. When the first security parameter indication is a new information element in a packet header of a PDCP data packet, refer to related description on 211 for a specific value of the first security parameter indication.

222. The target base station selects a security parameter according to the first security parameter indication in the second uplink data, and performs the second security processing on the second uplink data.

Specifically, when the first security parameter indication in the second uplink data indicates the first security parameter, the second uplink data needs to be forwarded to the source base station for the second security processing, and the target base station does not perform the second security processing on the second uplink data; or when the first security parameter indication in the second uplink data indicates the second security parameter, the target base station performs the second security processing on the second uplink data using the second security parameter.

Refer to description of 211 for how to specifically determine whether the first security parameter indication in the second uplink data indicates the first security parameter or the second security parameter.

223. The target base station sends, to the S-GW, data on which the second security processing is completed. It can be understood that PDCP header information needs to be removed before the data is sent to the S-GW, and the data is encapsulated in an S1 interface data format.

224. The target base station sends, to the source base station, data of which the first security parameter indication indicates the first security parameter. The data is received by the target base station using the air interface, and the data may include the first security parameter indication, used to indicate whether the first security processing of the data is performed using the first security parameter or the second security parameter.

Optionally, the target base station sends, to the source base station using a fourth GTP tunnel, data with a logical channel identifier of LCID2, where the data is received by the target base station using the air interface.

225. The source base station performs the second security processing on the data that is from the target base station, where the first security parameter is used in the second security processing.

226. The source base station sends, to the target base station, data that is obtained through the second security processing, where the data may include the first security parameter indication. Optionally, when the first security parameter indication is a logical channel identifier, the data may be transmitted on the second GTP tunnel.

227. The target base station sends, to the S-GW, the data that is from the source base station, where the first security parameter indication of the data indicates the first security parameter, or the data is transmitted using the second GTP tunnel. It can be understood that PDCP header information needs to be removed before the data is sent to the S-GW, and the data is encapsulated in an S1 interface data format.

As described above, the first security parameter indication is introduced, and the source base station and the target base station can determine, based on the first security parameter indication in the uplink data, whether the first security processing of the uplink data is performed using the first security parameter or the second security parameter, so as to select a corresponding security parameter to perform the second security processing, thereby resolving a problem that decrypted data at a confusion stage is incorrect.

The foregoing uplink data process is described based on a scenario in which an S1 path has been switched, for a scenario in which the S1 path has not been switched, there is a similar data process that can be obtained by referring to the foregoing process.

FIG. 3 is a schematic diagram of a possible downlink data transmission process of a split bearer according to an embodiment of the present invention.

311. A source base station performs first security processing on data that is on a split bearer and that is from an S-GW, to obtain second downlink data, where the first security processing includes encryption processing on the data on the split bearer, a first security parameter is used in the first security processing, and the first security parameter includes a key of the source base station and/or a security algorithm of the source base station.

Optionally, the source base station splits the second downlink data, where one part of the data is sent to UE using an air interface of the source base station; and the other part of the data is sent to a target base station using an X2-U interface (a data plane interface between one base station and another base station), is sent to the UE using an air interface of the target base station.

312. The source base station sends the second downlink data to UE, where the second downlink data includes a second security parameter indication, and the second security parameter indication is used to indicate whether a security parameter used in the first security processing of the second downlink data is a first security parameter or a second security parameter. The second security parameter indication herein indicates that a security parameter used for the second downlink data is the first security parameter.

Specifically, the second security parameter indication may be a logical channel identifier, and different logical channel identifiers separately correspond to the first security parameter and the second security parameter. The logical channel identifier herein is LCID1, and LCID1 indicates the first security parameter. Correspondingly, the second downlink data is carried on a first logical channel. The second security parameter indication may alternatively be a new information element in a PDCP packet header, used to indicate the first security parameter. Refer to related description on 211 for the new information element.

It can be understood that definitions of the second security parameter indication and a first security parameter indication are similar, and a difference between the second security parameter indication and the first security parameter indication lies in that, the second security parameter indication is used to indicate a security parameter used in the first security processing of downlink data, and the first security parameter indication is used to indicate a security parameter used in the first security processing of uplink data.

313. The source base station sends the second downlink data to a target base station using the X2-U interface, where the second downlink data includes the second security parameter indication or is transmitted using a particular GTP tunnel, to indicate that the security parameter used for the data is the first security parameter.

314. The target base station sends, to the UE using the air interface, the second downlink data that is from the source base station, where the second downlink data includes the second security parameter indication. The second security parameter indication herein indicates that a security parameter used for the second downlink data is the first security parameter.

Specifically, the second security parameter indication may be a logical channel identifier, the logical channel identifier is LCID2, and LCID2 indicates the first security parameter. Correspondingly, the second downlink data is carried on a second logical channel. The security parameter indication may alternatively be a new information element in a PDCP packet header, used to indicate the first security parameter. Refer to related description on 211 for the new information element.

321. The target base station performs the first security processing on data that is on the split bearer and that is from the S-GW, to obtain second downlink data, where the first security processing includes encryption processing on the data on the split bearer, a second security parameter is used in the first security processing, and the second security parameter includes a key of the target base station and/or a security algorithm of the target base station.

Optionally, the target base station splits the second downlink data, where one part of the data is sent to the UE using the air interface of the target base station; and the other part of the data is sent to the source base station using the X2-U interface, and is sent to the UE using the air interface of the source base station.

It can be understood that the target base station performs the first security processing on the data on the split bearer using the second security parameter after the target base station receives the fourth message in FIG. 1.

322. The target base station sends the second downlink data to the UE, where the second downlink data includes a second security parameter indication. The second security parameter indication herein indicates that a security parameter used for the downlink data is the second security parameter.

Specifically, the second security parameter indication may be a logical channel identifier, the logical channel identifier is LCID4, and LCID4 indicates the second security parameter. Correspondingly, the second downlink data is carried on a fourth logical channel. The second security parameter indication may alternatively be a new information element in a PDCP packet header, used to indicate the second security parameter. Refer to related description on 211 for the new information element.

323. The target base station sends the second downlink data to the source base station using the X2-U interface, where the second downlink data includes the second security parameter indication or is transmitted using a first GTP tunnel, to indicate that a security parameter used for the data is the second security parameter.

324. The source base station sends, to the UE using the air interface, the second downlink data that is from the target base station, where the second downlink data includes the second security parameter indication. The second security parameter indication herein indicates that a security parameter used for the downlink data is the second security parameter.

Specifically, the second security parameter indication may be a logical channel identifier, the logical channel identifier is LCID3, and LCID3 indicates the second security parameter. Correspondingly, the second downlink data is carried on a third logical channel. The second security parameter indication may alternatively be a new information element in a PDCP packet header, used to indicate the second security parameter. Refer to related description on 211 for the new information element.

331. The UE selects a security parameter according to the second security parameter indication in the second downlink data, and performs second security processing on the second downlink data, where the second security processing includes decryption processing on the data on the split bearer. Specifically, when the second security parameter indication in the second downlink data indicates the first security parameter, the UE performs the second security processing on the second downlink data using the first security parameter; or when the second security parameter indication in the second downlink data indicates the second security parameter, the UE performs the second security processing on the second downlink data using the second security parameter. Refer to related description on the first security parameter in 211 for how to specifically determine whether the second security parameter indication in the data indicates the first security parameter or the second security parameter.

As described above, the second security parameter indication is introduced, and the UE can determine, based on the second security parameter indication in the downlink data, whether the first security processing of the data is performed using the first security parameter or the second security parameter, so as to select a corresponding security parameter to perform the second security processing, thereby resolving a problem that decrypted data at a confusion stage is incorrect.

In the foregoing embodiments, an explicit security parameter indication is included in the data. Alternatively, whether security processing is performed using the first security parameter or the second security parameter may be indicated using an implicit method. For example, if the UE uses a cell radio network temporary identifier 1 (C-RNTI 1) before a PCell change, a base station allocates a new C-RNTI 2, and sends the new C-RNTI 2 to the UE during the PCell change. When the UE (or the base station) performs the first security processing on data using the first security parameter and then sends processed data to a peer end, the UE (or the base station) sends the data using the C-RNTI 1; or when the UE (or the base station) performs the first security processing on data using the second security parameter and then sends processed data to a peer end, the UE (or the base station) sends the data using the C-RNTI 2. After receiving the data, the peer end selects a corresponding security parameter based on the used C-RNTI 1 or C-RNTI 2 to perform the second security processing on the data. Refer to the foregoing description for a specific step, and details are not described herein again.

It can be understood that the foregoing embodiments in FIG. 1, FIG. 2, and FIG. 3 are correlated embodiments of a security parameter change in a PCell changing process between base stations. FIG. 1 corresponds to a control plane process of the security parameter change, FIG. 2 corresponds to the uplink data transmission process, and FIG. 3 corresponds to the downlink data transmission process. Data transmission is bi-directional for some services, for example, a Transmission Control Protocol (TCP)-based service; and data transmission is unidirectional for some other services, for example, a User Datagram Protocol (UDP)-based service. Therefore, for the first bearer, uplink data transmission and downlink data transmission may co-exist, or only downlink data transmission or only uplink data transmission may exist.

Figure 4:
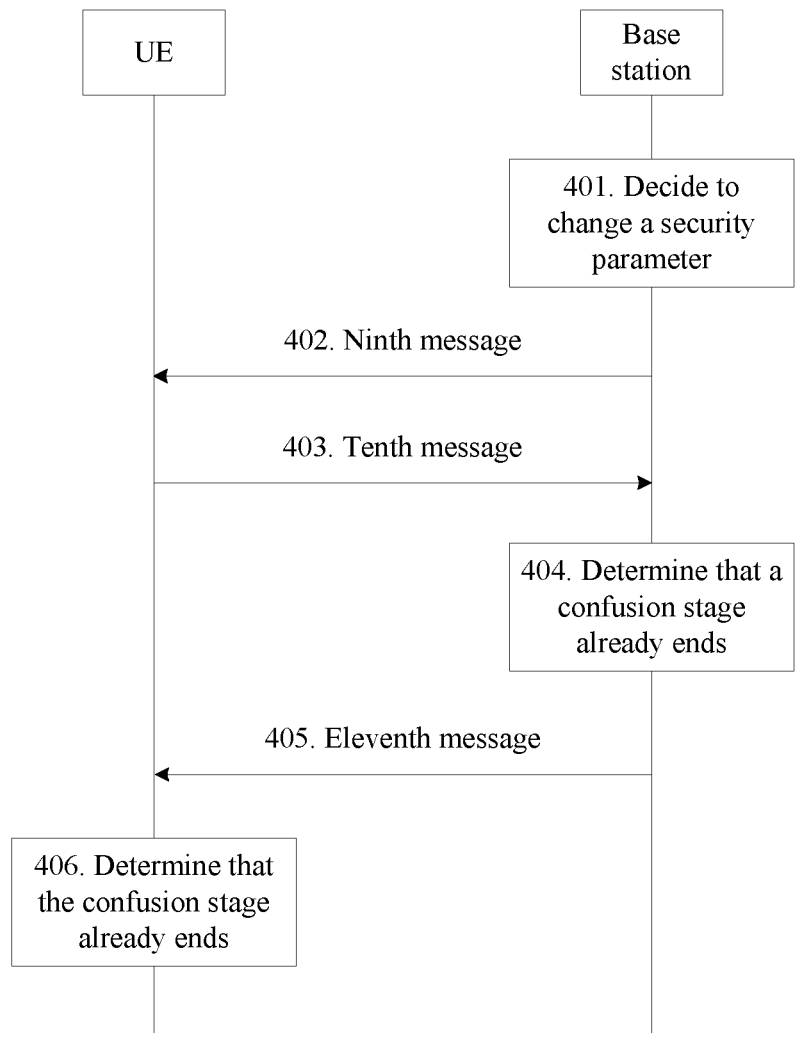
FIG. 4 is a schematic diagram of a possible control plane process of a security parameter change in a base station according to an embodiment of the present invention.

FIG. 4 is a schematic diagram of a possible control plane process of a security parameter change in a base station according to an embodiment of the present invention.

401. A base station decides to change a security parameter, where the security parameter includes a key and/or a security algorithm, and the security parameter may be used for third security processing and fourth security processing. The third security processing includes at least one of integrity protection for data on a signaling radio bearer, encryption processing for the data on the signaling radio bearer, and encryption processing for data on a data radio bearer. The fourth security processing includes at least one of integrity protection check for data on a signaling radio bearer, decryption processing for the data on the signaling radio bearer, and decryption processing for data on a data radio bearer.

After deciding to change the security parameter, the base station derives a new security parameter, that is, a fourth security parameter, according to a specific rule. Before the base station decides to change the security parameter, the base station communicates with UE using a third security parameter. Specifically, how the base station derives the fourth security parameter is the prior art, and details are not described herein. The base station may change the security parameter to avoid reusing a COUNT value using a same key and radio bearer identity (RB ID).

If the base station is a master eNodeB of UE for which DC is configured, the security parameter change affects an MCG bearer and a split bearer. If the base station is a secondary eNodeB of UE for which DC is configured, the security parameter change affects an SCG bearer. If UE is in a single carrier scenario or a CA scenario, an affected bearer includes at least one of a signaling bearer and a data bearer. There may be one or more affected bearers. For ease of description, it is assumed that there is only one affected bearer, and the affected bearer is referred to as a first bearer. For a scenario in which there is a plurality of affected bearers, a person of ordinary skill in the art can obtain a corresponding embodiment based on this embodiment of the present invention without creative efforts, and therefore the scenario is also in the protection scope of the present application.

It can be understood that the third security parameter is a security parameter that is used to perform the third security processing and the fourth security processing on data on the first bearer before the security parameter change; and the fourth security parameter is a security parameter that is used to perform the third security processing and the fourth security processing on data on the first bearer after the security parameter change.

Optionally, the base station allocates a new logical channel, that is, a sixth logical channel, to the affected first bearer, and a corresponding logical channel identifier is LCID6. The sixth logical channel is used to carry the data that is on the first bearer and that is obtained through the third security processing using the fourth security parameter. Before deciding to perform the security parameter change, the base station has allocated a fifth logical channel to the first bearer, and a corresponding logical channel identifier is LCID5. The fifth logical channel is used to carry data that is on the first bearer and that is obtained through the third security processing using the third security parameter.

402. The base station sends a ninth message to UE, where the ninth message is used to trigger a security parameter change, and the change of the security parameter indicates that a security parameter of the first bearer is changed from the third security parameter to the fourth security parameter. The ninth message may include a bearer identifier of the first bearer. The ninth message may further include information about a logical channel, the information about the logical channel includes a logical channel identifier, and the logical channel is newly added and is used to carry data that is on the first bearer and that is obtained through the third security processing using the fourth security parameter. Specifically, the ninth message includes information about the sixth logical channel. Therefore, the UE can learn that the first bearer corresponds to two logical channels, where the fifth logical channel is established before the ninth message is received, and the sixth logical channel is established after the ninth message is received.

Optionally, the ninth message may further include a sixth COUNT value, and the sixth COUNT value is a start COUNT value of downlink data that is obtained through the third security processing using the fourth security parameter.

The ninth message may be an RRC connection reconfiguration message including a security parameter change indication.

After receiving the ninth message, the UE derives the fourth security parameter in a manner the same as that of a network side. Before receiving the ninth message, the UE communicates with the base station using the third security parameter.

403. The UE sends a tenth message to the base station, where the tenth message may be used to indicate that the change of the security parameter of the first bearer is completed. Optionally, the tenth message may include a fifth COUNT value, and the fifth COUNT value is a start COUNT value of uplink data that is obtained through the third security processing using the fourth security parameter.

404. The base station determines that a confusion stage of data transmission of the first bearer already ends, and deletes a fifth logical channel.

Specifically, the base station separately determines whether a confusion stage of uplink data transmission and a confusion stage of downlink data transmission of the first bearer already end, and if both the confusion stage of uplink data transmission and the confusion stage of downlink data transmission already end, the base station considers that the confusion stage of data transmission of the first bearer already ends.

Specifically, if the base station determines that all data that is of downlink data on the first bearer and that has a COUNT value prior to the sixth COUNT value is successfully received by the UE, the base station considers that the confusion stage of downlink data transmission of the first bearer already ends.

Specifically, if the base station determines that all data that is of uplink data on the first bearer and that has a COUNT value prior to the fifth COUNT value is successfully received by the base station, the base station considers that the confusion stage of uplink data transmission of the first bearer already ends. If the tenth message does not include the fifth COUNT value, the fifth COUNT value is set to a COUNT value of a first piece of uplink data that is received by the base station and that is obtained through the third security processing using the fourth security parameter.

405. Optionally, the base station sends an eleventh message to the UE, where the eleventh message is used to indicate that the confusion stage ends or to instruct to delete an old logical channel, and the eleventh message includes the bearer identifier of the first bearer.

After receiving the eleventh message, the UE deletes the fifth logical channel.

406. Optionally, the UE determines that the confusion stage of data transmission of the first bearer already ends, and releases the fifth logical channel.

Specifically, the UE separately determines whether the confusion stage of uplink data transmission and the confusion stage of downlink data transmission of the first bearer already end, if both the confusion stage of uplink data transmission and the confusion stage of downlink data transmission already end, the UE considers that the confusion stage of data transmission of the first bearer already ends.

Specifically, if the UE determines that all data that is of downlink data on the first bearer and that has a COUNT value prior to the sixth COUNT value is successfully received by the UE, the UE considers that the confusion stage of downlink data transmission of the first bearer already ends. If the ninth message does not include the sixth COUNT value, the sixth COUNT value is set to a COUNT value of a first piece of downlink data that is received by the UE and that is obtained through the third security processing using the fourth security parameter.

Specifically, if the UE determines that all data that is of uplink data on the first bearer and that has a COUNT value prior to the fifth COUNT value is successfully received by the base station, the UE considers that the confusion stage of uplink data transmission of the first bearer already ends.

This embodiment of the present invention imposes no limitation on an execution sequence of 404 and 406.

Figure 5:
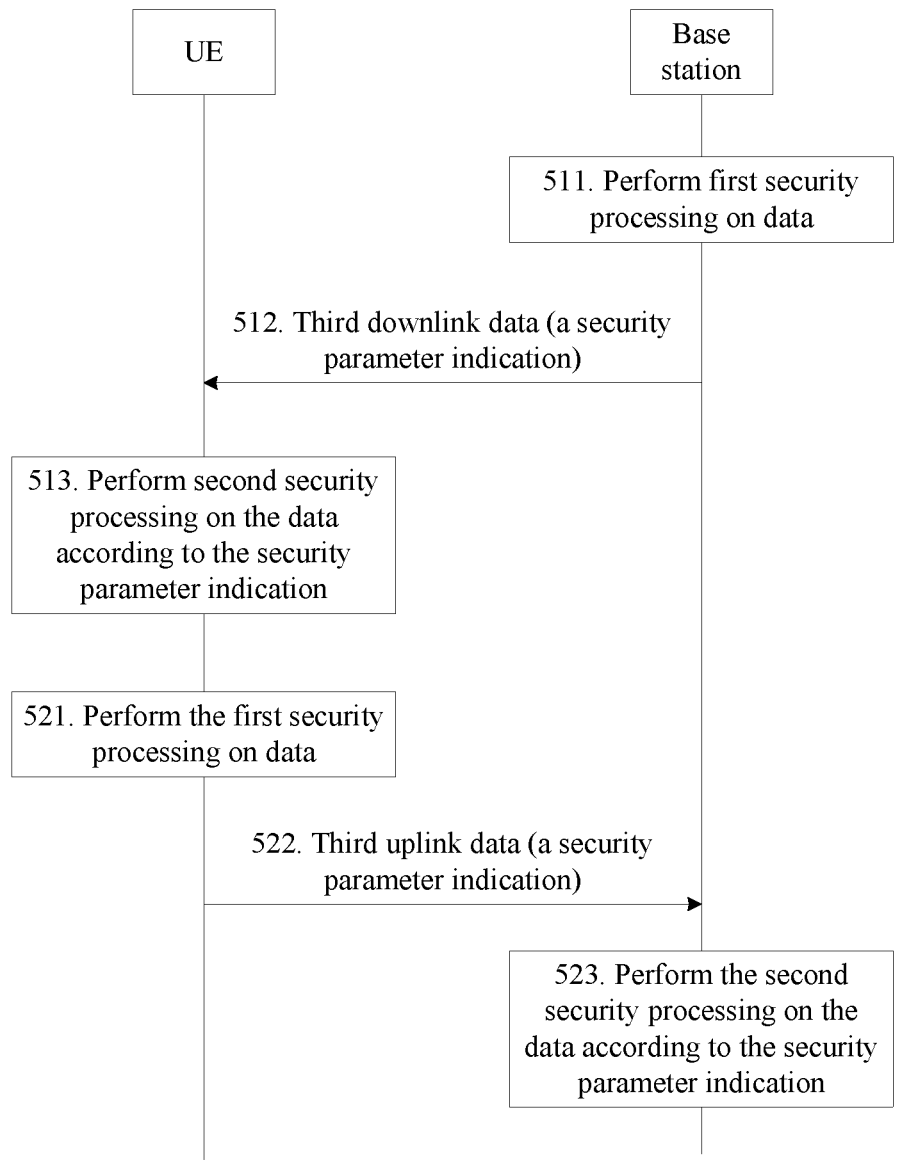
FIG. 5 is a schematic diagram of a possible data plane process of a security parameter change in a base station according to an embodiment of the present invention.

FIG. 5 is a schematic diagram of a possible data plane process of a security parameter change in a base station according to an embodiment of the present invention.

511. A base station performs third security processing on downlink data on a first bearer, to obtain third downlink data, where the third security processing includes at least one of integrity protection for the data on a signaling radio bearer, encryption processing for the data on the signaling radio bearer, and encryption processing for the data on a data radio bearer.

Specifically, after a security parameter switching time point, the third security processing is performed on the downlink data using a fourth security parameter, the downlink data may be carried on a sixth logical channel, and LCID6 is used; and before the security parameter switching time point, the third security processing is performed on the downlink data using a third security parameter, the downlink data may be carried on a fifth logical channel, and LCID5 is used. The security parameter switching time point may be a time point at which the base station decides to perform the security parameter change, or a time point at which the base station sends a ninth message to UE, or a time point at which the base station receives a tenth message from the UE.

512. The base station sends the third downlink data to UE, where the third downlink data includes a third security parameter indication, and the third security parameter indication is used to indicate whether a security parameter used in the third security processing of the third downlink data is the third security parameter or the fourth security parameter.

Specifically, the third security parameter indication may be a logical channel identifier, and different logical channel identifiers separately correspond to the third security parameter and the fourth security parameter. The logical channel identifier is LCID5 or LCID6, where LCID5 indicates the third security parameter, and LCID6 indicates the fourth security parameter. When the third security parameter indication is a logical channel identifier, the third downlink data may be carried on a logical channel corresponding to the logical channel identifier.

The third security parameter indication may alternatively be a new information element in a packet header of a PDCP data packet, for example, may be a fixed bit or a cyclic change of a plurality of bits, and a value change of the bit indicates that the security parameter is changed from the third security parameter to the fourth security parameter. Assuming that a value of the third security parameter indication is 0 before the security parameter change, and turns to 1 after the security parameter change, 0 represents that the third security parameter indication indicates the third security parameter, and 1 represents that the third security parameter indication indicates the fourth security parameter; on the contrary, assuming that a value of the third security parameter indication is 1 before the security parameter change, and turns to 0 after the security parameter change, 1 represents that the third security parameter indication indicates the third security parameter, and 0 represents that the third security parameter indication indicates the fourth security parameter. It can be understood that whether a value of the bit is changed is determined depending on a value of the bit before the security parameter change.

513. The UE selects a security parameter according to the third security parameter indication in the third downlink data, and performs the fourth security processing on the third downlink data, where the fourth security processing includes at least one of integrity protection check for data on the signaling radio bearer, decryption processing for the data on the signaling radio bearer, and decryption processing for data on the data radio bearer. Specifically, when the third security parameter indication in the third downlink data indicates the third security parameter, the UE performs the fourth security processing on the third downlink data using the third security parameter; or when the third security parameter indication in the third downlink data indicates the fourth security parameter, the UE performs the fourth security processing on the third downlink data using the fourth security parameter.

Refer to description of 512 for how to specifically determine whether the third security parameter indication in the data indicates the third security parameter or the fourth security parameter.

521. The UE performs the third security processing on uplink data on the first bearer, to obtain third uplink data.

Specifically, after a security parameter switching time point, the third security processing is performed on the uplink data using the fourth security parameter, the uplink data may be carried on the sixth logical channel, and LCID6 is used; and before the security parameter switching time point, the third security processing is performed on the uplink data using the third security parameter, the data on the first bearer may be carried on the fifth logical channel, and LCID5 is used. The security parameter switching time point may be a time point at which the UE receives the ninth message, or a time point at which the UE sends the tenth message, or another specific time point determined by the UE.

522. The UE sends the third uplink data to the base station, where the third uplink data includes a fourth security parameter indication, and the fourth security parameter indication is used to indicate whether a security parameter used in the third security processing of the third uplink data is the third security parameter or the fourth security parameter. Refer to related description on the third security parameter indication in 512 for a definition of the fourth security parameter indication.

It can be understood that, definitions of the fourth security parameter indication and the third security parameter indication are similar, and a difference between the fourth security parameter indication and the third security parameter indication is that, the third security parameter indication is used to indicate the security parameter used for the downlink data, and the fourth security parameter indication is used to indicate the security parameter used for the uplink data. When the fourth security parameter indication is a logical channel identifier, the third uplink data may be carried on a logical channel corresponding to the logical channel identifier.

523. The base station selects a security parameter according to the fourth security parameter indication in the third uplink data, and performs the fourth security processing on the third uplink data. Specifically, when the fourth security parameter indication in the third uplink data indicates the third security parameter, the base station performs the fourth security processing on the third uplink data using the third security parameter; or when the fourth security parameter indication in the third uplink data indicates the fourth security parameter, the base station performs the fourth security processing on the third uplink data using the fourth security parameter.

Refer to related description on the third security parameter indication in 512 for how to specifically determine whether the fourth security parameter indication in the data indicates the third security parameter or the fourth security parameter.

As described above, the security parameter indication is introduced, and the UE or the base station can determine, based on the security parameter indication in the downlink data or the uplink data, whether the third security processing of the data is performed using the third security parameter or the fourth security parameter, so as to select a corresponding security parameter to perform the fourth security processing, thereby resolving a problem that decrypted data at a confusion stage is incorrect.

In the foregoing embodiments, an explicit security parameter indication is included in the data. Alternatively, whether security processing is performed using the third security parameter or the fourth security parameter may be indicated using an implicit method. For example, if the UE uses a C-RNTI 1 before the security parameter change, the base station allocates a new C-RNTI 2, adds the new C-RNTI 2 to the ninth message, and sends the ninth message to the UE. When the UE (or the base station) performs the third security processing on data using the third security parameter and then sends processed data to a peer end, the UE (or the base station) sends the data using the C-RNTI 1; or when the UE (or the base station) performs the third security processing on data using the fourth security parameter and then sends processed data to a peer end, the UE (or the base station) sends the data using the C-RNTI 2. After receiving the data, the peer end selects a corresponding security parameter based on the used C-RNTI 1 or C-RNTI 2 to perform the fourth security processing on the data. Refer to the foregoing description for a specific step, and details are not described herein again.

It can be understood that the foregoing embodiments in FIG. 4 and FIG. 5 are correlated embodiments of a security parameter change in a base station. FIG. 4 corresponds to a control plane process of the security parameter change, and FIG. 5 corresponds to a data plane process of the security parameter change. Data transmission is bi-directional for some services, for example, a Transmission Control Protocol (Transmission TCP)-based service; and data transmission is unidirectional for some other services, for example, a User Datagram Protocol (UDP)-based service. Therefore, for the first bearer, uplink data transmission and downlink data transmission may co-exist, or only downlink data transmission or only uplink data transmission may exist.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

The foregoing mainly describes the solutions provided in the embodiments of the present invention from the perspective of interaction between network elements. It can be understood that, to implement the foregoing functions, the network elements, such as the UE, the base station, and the MME, include a corresponding hardware structure and/or software module for executing the functions. A person skilled in the art may be easily aware that, the units and steps in the examples described with reference to the embodiments disclosed herein may be implemented in the present application by computer software, hardware, or a combination thereof. Whether a function is performed by the hardware, the computer software, or by driving the hardware by the computer software depends on particular applications and design constraints of the technical solutions. A person skilled in the art may use different methods to implement the described functions for each particular application, but it should not be considered that the implementation goes beyond the scope of the present application.

The foregoing describes in detail the data transmission methods according to the embodiments of the present invention, and the following describes a base station and UE according to embodiments of the present invention. It should be understood that, the base station and the UE in the embodiments of the present invention can perform the methods in the foregoing embodiments of the present invention. In other words, refer to the corresponding processes in the foregoing method embodiments for specific working processes of the following apparatuses.

Figure 6:
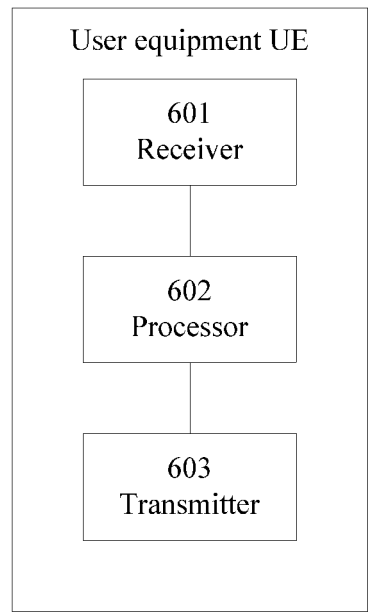
FIG. 6 is a schematic diagram of a possible apparatus structure of UE according to an embodiment of the present invention.

FIG. 6 is a schematic diagram of a possible apparatus structure of UE according to an embodiment of the present invention. The UE includes a receiver 601, a processor 602, and a transmitter 603.

The receiver 601 is configured to receive a first message, where the first message is used to trigger a change of a security parameter of a first bearer, the first bearer is a signaling radio bearer or a data radio bearer, the security parameter includes a key and/or a security algorithm, and the change of the security parameter indicates that the security parameter of the first bearer is changed from a first security parameter to a second security parameter.

The transmitter 603 is configured to send a second message, where the second message is used to indicate that the change of the security parameter of the first bearer is completed.

The processor 602 is configured to perform first security processing on uplink data on the first bearer, to obtain second uplink data, where the first security processing includes at least one of integrity protection for data on the signaling radio bearer, encryption processing for the data on the signaling radio bearer, and encryption processing for data on the data radio bearer.

The transmitter 603 is further configured to send the second uplink data, where the second uplink data includes a first security parameter indication, and the first security parameter indication is used to indicate a security parameter used in the first security processing of the second uplink data.

Optionally, the receiver 601 is further configured to receive downlink data on the first bearer, where the downlink data is obtained through the first security processing, the downlink data includes a second security parameter indication, and the second security parameter indication is used to indicate a security parameter used in the first security processing of the downlink data. The processor 602 is further configured to select the security parameter according to the second security parameter indication in the downlink data, and perform second security processing on the downlink data, where the second security processing includes at least one of integrity protection check for data on the signaling radio bearer, decryption processing for the data on the signaling radio bearer, and decryption processing for data on the data radio bearer.

Optionally, the first message may further include information about a logical channel, the information about the logical channel includes a logical channel identifier, and the logical channel is used to carry data that is on the first bearer and that is obtained through the first security processing using the second security parameter.

The first security parameter indication and the second security parameter indication may be logical channel identifiers, and different logical channel identifiers separately correspond to the first security parameter and the second security parameter. Specifically, a logical channel identifier of a first logical channel and a logical channel identifier of a second logical channel correspond to the first security parameter, and a logical channel identifier of a third logical channel and a logical channel identifier of a fourth logical channel correspond to the second security parameter, where the first logical channel and the second logical channel are used to carry data that is on the first bearer and that is obtained through the first security processing using the first security parameter, and the third logical channel and the fourth logical channel are used to carry data that is on the first bearer and that is obtained through the first security processing using the second security parameter; or a logical channel identifier of a fifth logical channel corresponds to the first security parameter, and a logical channel identifier of a sixth logical channel corresponds to the second security parameter, where the fifth logical channel is used to carry data that is on the first bearer and that is obtained through the first security processing using the first security parameter, and the sixth logical channel is used to carry data that is on the first bearer and that is obtained through the first security processing using the second security parameter.

The first security parameter indication and the second security parameter indication may alternatively be a bit, and a value change of the bit indicates that the security parameter is changed from the first security parameter to the second security parameter. There is another implementation form of the first security parameter indication and the second security parameter indication. For details, refer to related description on the method embodiments.

The processor 602 may be further configured to: after the first message is received or after the second message is sent, perform the first security processing on the uplink data using the second security parameter; or before the first message is received or before the second message is sent, perform the first security processing on the uplink data using the first security parameter.

The processor 602 may be further configured to: when the second security parameter indication in the downlink data indicates the first security parameter, perform the second security processing on the downlink data using the first security parameter; or when the second security parameter indication in the downlink data indicates the second security parameter, perform the second security processing on the downlink data using the second security parameter.

Optionally, the first message is from a base station, and the second message is sent to the base station; or the first message is from a source base station, and the second message is sent to a target base station, where the source base station is a base station in which a source primary cell is located, and the target base station is a base station in which a target primary cell is located.

It can be understood that FIG. 6 shows only one design of the UE. In an actual application, the UE may include any quantity of receivers, transmitters, and processors. The receiver and the transmitter may be independent physical entities or may be integrated into a same physical entity. For example, the receiver and the transmitter are integrated into a physical entity of a receiver. All UEs that can implement the embodiments of the present invention fall within the protection scope of the present application.

Figure 7:
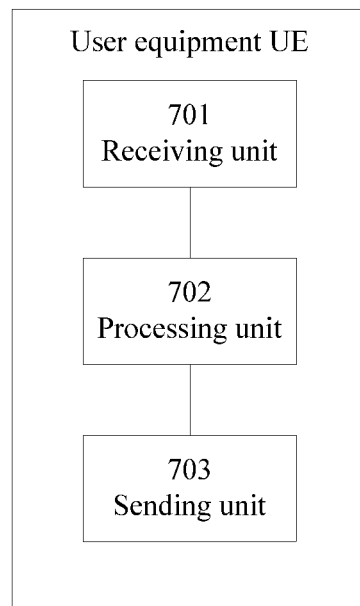
FIG. 7 is a schematic diagram of another possible apparatus structure of UE according to an embodiment of the present invention.

FIG. 7 is a schematic diagram of another possible apparatus structure of UE according to an embodiment of the present invention. The UE includes a receiving unit 701, a processing unit 702, and a sending unit 703.

The receiving unit 701 is configured to receive a first message, where the first message is used to trigger a change of a security parameter of a first bearer, the first bearer is a signaling radio bearer or a data radio bearer, the security parameter includes a key and/or a security algorithm, and the change of the security parameter indicates that the security parameter of the first bearer is changed from a first security parameter to a second security parameter.

The sending unit 703 is configured to send a second message, where the second message is used to indicate that the change of the security parameter of the first bearer is completed.

The processing unit 702 is configured to perform first security processing on uplink data on the first bearer, to obtain second uplink data, where the first security processing includes at least one of integrity protection for data on the signaling radio bearer, encryption processing for the data on the signaling radio bearer, and encryption processing for data on the data radio bearer.

The sending unit 703 is further configured to send the second uplink data, where the second uplink data includes a first security parameter indication, and the first security parameter indication is used to indicate a security parameter used in the first security processing of the second uplink data.

Optionally, the receiving unit 701 is further configured to receive downlink data on the first bearer, where the downlink data is obtained through the first security processing, the downlink data includes a second security parameter indication, and the second security parameter indication is used to indicate a security parameter used in the first security processing of the downlink data. The processing unit 702 is further configured to select the security parameter according to the second security parameter indication in the downlink data, and perform second security processing on the downlink data. The second security processing includes at least one of integrity protection check for data on the signaling radio bearer, decryption processing for the data on the signaling radio bearer, and decryption processing for data on the data radio bearer.

Optionally, the first message may further include information about a logical channel, the information about the logical channel includes a logical channel identifier, and the logical channel is used to carry data that is on the first bearer and that is obtained through the first security processing using the second security parameter.

The first security parameter indication and the second security parameter indication may be logical channel identifiers, and different logical channel identifiers separately correspond to the first security parameter and the second security parameter. Specifically, a logical channel identifier of a first logical channel and a logical channel identifier of a second logical channel correspond to the first security parameter, and a logical channel identifier of a third logical channel and a logical channel identifier of a fourth logical channel correspond to the second security parameter, where the first logical channel and the second logical channel are used to carry data that is on the first bearer and that is obtained through the first security processing using the first security parameter, and the third logical channel and the fourth logical channel are used to carry data that is on the first bearer and that is obtained through the first security processing using the second security parameter; or a logical channel identifier of a fifth logical channel corresponds to the first security parameter, and a logical channel identifier of a sixth logical channel corresponds to the second security parameter, where the fifth logical channel is used to carry data that is on the first bearer and that is obtained through the first security processing using the first security parameter, and the sixth logical channel is used to carry data that is on the first bearer and that is obtained through the first security processing using the second security parameter.

The first security parameter indication and the second security parameter indication may alternatively be a bit, and a value change of the bit indicates that the security parameter is changed from the first security parameter to the second security parameter. There is another implementation form of the first security parameter indication and the second security parameter indication. For details, refer to related description on the method embodiments.

The processing unit 702 may be further configured to: after the first message is received or after the second message is sent, perform the first security processing on the uplink data using the second security parameter; or before the first message is received or before the second message is sent, perform the first security processing on the uplink data using the first security parameter.

The processing unit 702 may be further configured to: when the second security parameter indication in the downlink data indicates the first security parameter, perform the second security processing on the downlink data using the first security parameter; or when the second security parameter indication in the downlink data indicates the second security parameter, perform the second security processing on the downlink data using the second security parameter.

Optionally, the first message is from a base station, and the second message is sent to the base station; or the first message is from a source base station, and the second message is sent to a target base station, where the source base station is a base station in which a source primary cell is located, and the target base station is a base station in which a target primary cell is located.

Figure 8:
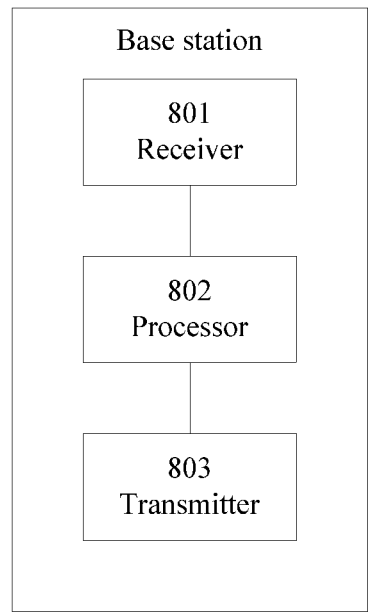
FIG. 8 is a schematic diagram of a possible apparatus structure of a base station according to an embodiment of the present invention.

FIG. 8 is a schematic diagram of a possible apparatus structure of a base station according to an embodiment of the present invention. The base station in this embodiment implements functions of the source base station in FIG. 1, FIG. 2, and FIG. 3 in the foregoing method embodiments. The base station includes a processor 802 and a transmitter 803. The base station may further include a receiver 801.

The transmitter 803 is configured to send a first message, where the first message is used to trigger a change of a security parameter of a first bearer, the first bearer is a data radio bearer, the security parameter includes a key and/or a security algorithm, and the change of the security parameter indicates that the security parameter of the first bearer is changed from a first security parameter to a second security parameter.

The processor 802 is configured to perform first security processing on downlink data on the first bearer, to obtain second downlink data, where the first security processing includes encryption processing on data on the data radio bearer.

The transmitter 803 is further configured to send the second downlink data, where the second downlink data includes a second security parameter indication, and the second security parameter indication is used to indicate a security parameter used in the first security processing of the second downlink data.

Optionally, the receiver 801 is configured to receive uplink data on the first bearer, where the uplink data is obtained through the first security processing, the uplink data includes a first security parameter indication, and the first security parameter indication is used to indicate a security parameter used in the first security processing of the uplink data; and the processor 802 is further configured to select the security parameter according to the first security parameter indication in the uplink data, and perform second security processing on the uplink data, where the second security processing includes decryption processing on data on the data radio bearer.

Optionally, the first message may further include information about a logical channel, the information about the logical channel includes a logical channel identifier, and the logical channel is used to carry data that is on the first bearer and that is obtained through the first security processing using the second security parameter.

The first security parameter indication and the second security parameter indication may be logical channel identifiers, and different logical channel identifiers separately correspond to the first security parameter and the second security parameter. Specifically, a logical channel identifier of a first logical channel and a logical channel identifier of a second logical channel correspond to the first security parameter, and a logical channel identifier of a third logical channel and a logical channel identifier of a fourth logical channel correspond to the second security parameter, where the first logical channel and the second logical channel are used to carry data that is on the first bearer and that is obtained through the first security processing using the first security parameter, and the third logical channel and the fourth logical channel are used to carry data that is on the first bearer and that is obtained through the first security processing using the second security parameter.

The first security parameter indication and the second security parameter indication may alternatively be a bit, and a value change of the bit indicates that the security parameter is changed from the first security parameter to the second security parameter. There is another implementation form of the first security parameter indication and the second security parameter indication. For details, refer to related description on the method embodiments.

Specifically, the processor 802 may be further configured to perform the first security processing on the downlink data using the first security parameter.

Specifically, the processor 802 may be further configured to: when the first security parameter indication in the uplink data indicates the first security parameter, perform the second security processing on the uplink data using the first security parameter.

An embodiment of the present invention further provides another possible apparatus of a base station. The base station in this embodiment implements functions of the target base station in FIG. 1, FIG. 2, and FIG. 3 in the foregoing method embodiments. The apparatus of the base station has a structural diagram similar to FIG. 8, and specifically includes a receiver, a processor, and a transmitter.

The receiver is configured to receive a second message, where the second message is used to indicate that a change of a security parameter of a first bearer is completed, and the first bearer is a data radio bearer.

The processor is configured to perform first security processing on downlink data on the first bearer, to obtain second downlink data, where the first security processing includes encryption processing on data on the data radio bearer.

The transmitter is configured to send the second downlink data, where the second downlink data includes a second security parameter indication, and the second security parameter indication is used to indicate a security parameter used in the first security processing of the second downlink data.

Optionally, the receiver is further configured to receive uplink data on the first bearer, where the uplink data is obtained through the first security processing, the uplink data includes a first security parameter indication, and the first security parameter indication is used to indicate a security parameter used in the first security processing of the uplink data; and the processor is further configured to select the security parameter according to the first security parameter indication in the uplink data, and perform second security processing on the uplink data, where the second security processing includes decryption processing on data on the data radio bearer.

The first security parameter indication and the second security parameter indication may be logical channel identifiers, and different logical channel identifiers separately correspond to the first security parameter and the second security parameter. Specifically, a logical channel identifier of a first logical channel and a logical channel identifier of a second logical channel correspond to the first security parameter, and a logical channel identifier of a third logical channel and a logical channel identifier of a fourth logical channel correspond to the second security parameter, where the first logical channel and the second logical channel are used to carry data that is on the first bearer and that is obtained through the first security processing using the first security parameter, and the third logical channel and the fourth logical channel are used to carry data that is on the first bearer and that is obtained through the first security processing using the second security parameter.

The first security parameter indication and the second security parameter indication may alternatively be a bit, and a value change of the bit indicates that the security parameter is changed from the first security parameter to the second security parameter. There is another implementation form of the first security parameter indication and the second security parameter indication. For details, refer to related description on the method embodiments.

Specifically, the processor may be further configured to perform the first security processing on the downlink data using the second security parameter.

Specifically, the processor may be further configured to: when the first security parameter indication in the uplink data indicates the second security parameter, perform the second security processing on the uplink data using the second security parameter.

An embodiment of the present invention further provides a possible apparatus of a base station. The base station in this embodiment implements functions of the base station in the foregoing method embodiments in FIG. 4 and FIG. 5. The apparatus of the base station has a structural diagram similar to FIG. 8, and specifically includes a receiver, a processor, and a transmitter.

The transmitter is configured to send a first message, where the first message is used to trigger a change of a security parameter of a first bearer, the first bearer is a signaling radio bearer or a data radio bearer, the security parameter includes a key and/or a security algorithm, and the change of the security parameter indicates that the security parameter of the first bearer is changed from a first security parameter to a second security parameter.

The receiver is configured to receive a second message, where the second message is used to indicate that the change of the security parameter of the first bearer is completed.

The processor is configured to perform first security processing on downlink data on the first bearer, to obtain second downlink data, where the first security processing includes at least one of integrity protection for data on the signaling radio bearer, encryption processing for the data on the signaling radio bearer, and encryption processing for data on the data radio bearer.

The transmitter is further configured to send the second downlink data, where the second downlink data includes a second security parameter indication, and the second security parameter indication is used to indicate a security parameter used in the first security processing of the second downlink data.

Optionally, the receiver is further configured to receive uplink data on the first bearer, where the uplink data is obtained through the first security processing, the uplink data includes a first security parameter indication, and the first security parameter indication is used to indicate a security parameter used in the first security processing of the uplink data; and the processor is further configured to select the security parameter according to the first security parameter indication in the uplink data, and perform second security processing on the uplink data, where the second security processing includes at least one of integrity protection check for data on the signaling radio bearer, decryption processing for the data on the signaling radio bearer, and decryption processing for data on the data radio bearer.

Optionally, the first message may further include information about a logical channel, the information about the logical channel includes a logical channel identifier, and the logical channel is used to carry data that is on the first bearer and that is obtained through the first security processing using the second security parameter.

The first security parameter indication and the second security parameter indication may be logical channel identifiers, and different logical channel identifiers separately correspond to the first security parameter and the second security parameter. Specifically, a logical channel identifier of a fifth logical channel corresponds to the first security parameter, and a logical channel identifier of a sixth logical channel corresponds to the second security parameter, where the fifth logical channel is used to carry data that is on the first bearer and that is obtained through the first security processing using the first security parameter, and the sixth logical channel is used to carry data that is on the first bearer and that is obtained through the first security processing using the second security parameter.

The first security parameter indication and the second security parameter indication may alternatively be a bit, and a value change of the bit indicates that the security parameter is changed from the first security parameter to the second security parameter. There is another implementation form of the first security parameter indication and the second security parameter indication. For details, refer to related description on the method embodiments.

Specifically, the processor may be further configured to: after the first message is sent or after the second message is received, perform the first security processing on the downlink data using the second security parameter; or before the first message is sent or before the second message is received, perform the first security processing on the downlink data using the first security parameter.

Specifically, the processor may be further configured to: when the first security parameter indication in the uplink data indicates the first security parameter, perform the second security processing on the uplink data using the first security parameter; or when the first security parameter indication in the uplink data indicates the second security parameter, perform the second security processing on the uplink data using the second security parameter.

It can be understood that, FIG. 8 shows only one apparatus structural diagram of the base station. In an actual application, the base station may include any quantity of receivers, transmitters, and processors. The receiver and the transmitter may be independent physical entities or may be integrated into a same physical entity. For example, the receiver and the transmitter are integrated into a physical entity of a receiver. All base stations that can implement the embodiments of the present invention fall within the protection scope of the present application.

Figure 9:
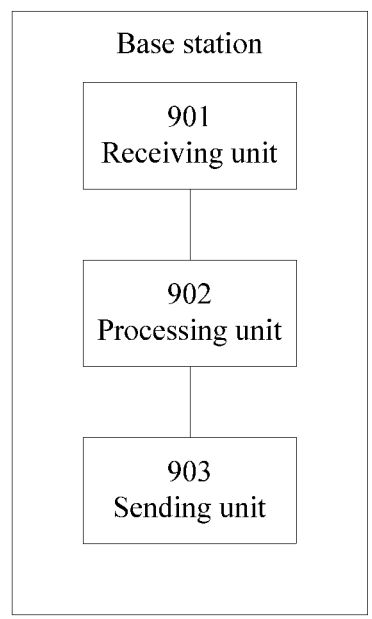
FIG. 9 is a schematic diagram of another possible apparatus structure of a base station according to an embodiment of the present invention.

FIG. 9 is a schematic diagram of another possible apparatus structure of a base station according to an embodiment of the present invention. The base station in this embodiment implements functions of the source base station in FIG. 1, FIG. 2, and FIG. 3 in the foregoing method embodiments. The base station includes a processing unit 902 and a sending unit 903, and the base station may further include a receiving unit 901.

The sending unit 903 is configured to send a first message, where the first message is used to trigger a change of a security parameter of a first bearer, the first bearer is a data radio bearer, the security parameter includes a key and/or a security algorithm, and the change of the security parameter indicates that the security parameter of the first bearer is changed from a first security parameter to a second security parameter.

The processing unit 902 is configured to perform first security processing on downlink data on the first bearer, to obtain second downlink data, where the first security processing includes encryption processing on data on the data radio bearer.

The sending unit 903 is further configured to send the second downlink data, where the second downlink data includes a second security parameter indication, and the second security parameter indication is used to indicate a security parameter used in the first security processing of the downlink data.

Optionally, the receiving unit 901 is configured to receive uplink data on the first bearer, where the uplink data is obtained through the first security processing, the uplink data includes a first security parameter indication, and the first security parameter indication is used to indicate a security parameter used in the first security processing of the uplink data; and the processing unit 902 is further configured to select the security parameter according to the first security parameter indication in the uplink data, and perform second security processing on the uplink data, where the second security processing includes decryption processing on data on the data radio bearer.

Optionally, the first message may further include information about a logical channel, the information about the logical channel includes a logical channel identifier, and the logical channel is used to carry data that is on the first bearer and that is obtained through the first security processing using the second security parameter.

The first security parameter indication and the second security parameter indication may be logical channel identifiers, and different logical channel identifiers separately correspond to the first security parameter and the second security parameter. Specifically, a logical channel identifier of a first logical channel and a logical channel identifier of a second logical channel correspond to the first security parameter, and a logical channel identifier of a third logical channel and a logical channel identifier of a fourth logical channel correspond to the second security parameter, where the first logical channel and the second logical channel are used to carry data that is on the first bearer and that is obtained through the first security processing using the first security parameter, and the third logical channel and the fourth logical channel are used to carry data that is on the first bearer and that is obtained through the first security processing using the second security parameter.

The first security parameter indication and the second security parameter indication may alternatively be a bit, and a value change of the bit indicates that the security parameter is changed from the first security parameter to the second security parameter. There is another implementation form of the first security parameter indication and the second security parameter indication. For details, refer to related description on the method embodiments.

Specifically, the processing unit 902 may be further configured to perform the first security processing on the downlink data using the first security parameter.

Specifically, the processing unit 902 may be further configured to: when the first security parameter indication in the uplink data indicates the first security parameter, perform the second security processing on the uplink data using the first security parameter.

An embodiment of the present invention further provides another possible apparatus of a base station. The base station in this embodiment implements functions of the target base station in FIG. 1, FIG. 2, and FIG. 3 in the foregoing method embodiments. The apparatus of the base station has a structural diagram similar to FIG. 9, and specifically includes a receiving unit, a processing unit, and a sending unit.

The receiving unit is configured to receive a second message, where the second message is used to indicate that a change of a security parameter of a first bearer is completed, and the first bearer is a data radio bearer.

The processing unit is configured to perform first security processing on downlink data on the first bearer, to obtain second downlink data, where the first security processing includes encryption processing on data on the data radio bearer.

The sending unit is configured to send the second downlink data, where the second downlink data includes a second security parameter indication, and the second security parameter indication is used to indicate a security parameter used in the first security processing of the second downlink data.

Optionally, the receiving unit is further configured to receive uplink data on the first bearer, where the uplink data is obtained through the first security processing, the uplink data includes a first security parameter indication, and the first security parameter indication is used to indicate a security parameter used in the first security processing of the uplink data; and the processing unit is further configured to select the security parameter according to the first security parameter indication in the uplink data, and perform second security processing on the uplink data, where the second security processing includes decryption processing on data on the data radio bearer.

The first security parameter indication and the second security parameter indication may be logical channel identifiers, and different logical channel identifiers separately correspond to the first security parameter and the second security parameter. Specifically, a logical channel identifier of a first logical channel and a logical channel identifier of a second logical channel correspond to the first security parameter, and a logical channel identifier of a third logical channel and a logical channel identifier of a fourth logical channel correspond to the second security parameter, where the first logical channel and the second logical channel are used to carry data that is on the first bearer and that is obtained through the first security processing using the first security parameter, and the third logical channel and the fourth logical channel are used to carry data that is on the first bearer and that is obtained through the first security processing using the second security parameter.

The first security parameter indication and the second security parameter indication may alternatively be a bit, and a value change of the bit indicates that the security parameter is changed from the first security parameter to the second security parameter. There is another implementation form of the first security parameter indication and the second security parameter indication. For details, refer to related description on the method embodiments.

Specifically, the processing unit may be further configured to perform the first security processing on the downlink data using the second security parameter.

Specifically, the processing unit may be further configured to: when the first security parameter indication in the uplink data indicates the second security parameter, perform the second security processing on the uplink data using the second security parameter.

An embodiment of the present invention further provides a possible apparatus of a base station. The base station in this embodiment implements functions of the base station in the foregoing method embodiments in FIG. 4 and FIG. 5. The apparatus of the base station has a structural diagram similar to FIG. 9, and specifically includes a receiving unit, a processing unit, and a sending unit.

The sending unit is configured to send a first message, where the first message is used to trigger a change of a security parameter of a first bearer, the first bearer is a signaling radio bearer or a data radio bearer, the security parameter includes a key and/or a security algorithm, and the change of the security parameter indicates that the security parameter of the first bearer is changed from a first security parameter to a second security parameter.

The receiving unit is configured to receive a second message, where the second message is used to indicate that the change of the security parameter of the first bearer is completed.

The processing unit is configured to perform first security processing on downlink data on the first bearer, to obtain second downlink data, where the first security processing includes at least one of integrity protection for data on the signaling radio bearer, encryption processing for the data on the signaling radio bearer, and encryption processing for data on the data radio bearer.

The sending unit is further configured to send the second downlink data, where the second downlink data includes a second security parameter indication, and the second security parameter indication is used to indicate a security parameter used in the first security processing of the second downlink data.

Optionally, the receiving unit is further configured to receive uplink data on the first bearer, where the uplink data is obtained through the first security processing, the uplink data includes a first security parameter indication, and the first security parameter indication is used to indicate a security parameter used in the first security processing of the uplink data; and the processing unit is further configured to select the security parameter according to the first security parameter indication in the uplink data, and perform second security processing on the uplink data, where the second security processing includes at least one of integrity protection check for data on the signaling radio bearer, decryption processing for the data on the signaling radio bearer, and decryption processing for data on the data radio bearer.

Optionally, the first message may further include information about a logical channel, the information about the logical channel includes a logical channel identifier, and the logical channel is used to carry data that is on the first bearer and that is obtained through the first security processing using the second security parameter.

The first security parameter indication and the second security parameter indication may be logical channel identifiers, and different logical channel identifiers separately correspond to the first security parameter and the second security parameter. Specifically, a logical channel identifier of a fifth logical channel corresponds to the first security parameter, and a logical channel identifier of a sixth logical channel corresponds to the second security parameter, where the fifth logical channel is used to carry data that is on the first bearer and that is obtained through the first security processing using the first security parameter, and the sixth logical channel is used to carry data that is on the first bearer and that is obtained through the first security processing using the second security parameter.

The first security parameter indication and the second security parameter indication may alternatively be a bit, and a value change of the bit indicates that the security parameter is changed from the first security parameter to the second security parameter. There is another implementation form of the first security parameter indication and the second security parameter indication. For details, refer to related description on the method embodiments.

Specifically, the processing unit may be further configured to: after the first message is sent or after the second message is received, perform the first security processing on the downlink data using the second security parameter; or before the first message is sent or before the second message is received, perform the first security processing on the downlink data using the first security parameter.

Specifically, the processing unit may be further configured to: when the first security parameter indication in the uplink data indicates the first security parameter, perform the second security processing on the uplink data using the first security parameter; or when the first security parameter indication in the uplink data indicates the second security parameter, perform the second security processing on the uplink data using the second security parameter.

It should be understood that the term "and/or" used in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The processor for executing the foregoing base station or UE in the embodiments of the present invention may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. It may implement or execute various examples of logical functions and modules that are described with reference to the contents disclosed in the present application.

The methods or algorithm steps described with reference to the content disclosed in the present application may be implemented in a hardware manner, or may be implemented in a manner of executing a software instruction by a processor. The software instruction may include a corresponding software module. The software module may be stored in a RAM memory, a flash memory, a ROM memory, an EPROM memory, an EEPROM memory, a register, a hard disk, a removable hard disk, a CD-ROM memory, or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in the user equipment or the base station. Certainly, the processor and the storage medium may exist in the user equipment as discrete components.

A person of skill in the art should be aware that in one or more of the foregoing examples, the functions described in the present application may be implemented using hardware, software, firmware, or any combination thereof. When this application is implemented by software, these functions may be stored in a computer-readable medium or transmitted as one or more instructions or code in the computer-readable medium. The computer-readable medium includes a computer storage medium and a communications medium, where the communications medium includes any medium that enables a computer program or related information to be transmitted from one place to another. The storage medium may be any available medium accessible to a general-purpose or dedicated computer.

The objectives, technical solutions, and benefit effects of the present application are further described in detail in the foregoing specific embodiments. It should be understood that the foregoing descriptions are merely specific embodiments of the present invention, but are not intended to limit the protection scope of the present application. Any modification, equivalent replacement, improvement, or the like made based on the technical solutions of the present application shall fall within the protection scope of the present application.

What is claimed is:

1. A method, comprising:
    receiving a first message by user equipment (UE), wherein the first message triggers a change of a security parameter of a first bearer from a first security parameter to a second security parameter, the first bearer is a signaling radio bearer or a data radio bearer, and the security parameter of the first bearer comprises a key or a security algorithm;
    sending a second message by the UE, wherein the second message indicates that the change of the security parameter of the first bearer is completed;
    after sending the second message, performing, by the UE, first security processing on uplink data on the first bearer, to obtain second uplink data, wherein the first security processing comprises: integrity protection for data on the signaling radio bearer, encryption processing for the data on the signaling radio bearer, or encryption processing for data on the data radio bearer; and
    sending the second uplink data by the UE, wherein the second uplink data comprises a first security parameter indication, and the first security parameter indication indicates a third security parameter used in the first security processing of the second uplink data, and wherein the first security parameter indication is a logical channel identifier, and different logical channel identifiers separately correspond to the first security parameter and the second security parameter.

2. The method according to claim 1, further comprising:
    receiving, by the UE, downlink data on the first bearer, wherein the downlink data is obtained through the first security processing, the downlink data comprises a second security parameter indication, and the second security parameter indication indicates a fourth security parameter used in the first security processing of the downlink data; and selecting, by the UE, the fourth security parameter according to the second security parameter indication in the downlink data, and performing, by the UE, second security processing on the downlink data, wherein the second security processing comprises: an integrity protection check for data on the signaling radio bearer, decryption processing for the data on the signaling radio bearer, or decryption processing for data on the data radio bearer.

3. The method according to claim 2, wherein:
the second security parameter indication is a logical channel identifier; or
the second security parameter indication is a bit, and a value change of the bit indicates that the security parameter of the first bearer has changed from the first security parameter to the second security parameter.

4. The method according to claim 2, wherein the selecting the fourth security parameter according to the second security parameter indication in the downlink data, and performing second security processing on the downlink data, comprises:
when the fourth security parameter is the first security parameter, performing, by the UE, the second security processing on the downlink data using the first security parameter; or
when the fourth security parameter is the second security parameter, performing, by the UE, the second security processing on the downlink data using the second security parameter.

5. The method according to claim 1, wherein different logical channel identifiers separately corresponding to the first security parameter and the second security parameter comprises:
a first logical channel identifier of a first logical channel and a second logical channel identifier of a second logical channel corresponding to the first security parameter, and a third logical channel identifier of a third logical channel and a fourth logical channel identifier of a fourth logical channel corresponding to the second security parameter, wherein the first logical channel and the second logical channel carry data that is on the first bearer and that is obtained through the first security processing using the first security parameter, and the third logical channel and the fourth logical channel carry data that is on the first bearer and that is obtained through the first security processing using the second security parameter; or
a fifth logical channel identifier of a fifth logical channel corresponding to the first security parameter, and a sixth logical channel identifier of a sixth logical channel corresponding to the second security parameter, wherein the fifth logical channel carries data that is on the first bearer and that is obtained through the first security processing using the first security parameter, and the sixth logical channel carries data that is on the first bearer and that is obtained through the first security processing using the second security parameter.

6. The method according to claim 1, wherein the first message further comprises information about a logical channel, the information about the logical channel comprises a logical channel identifier of the logical channel, and the logical channel carries data that is on the first bearer and that is obtained through the first security processing using the second security parameter.

7. The method according to claim 1, wherein:
the first message is from a first base station, and the second message is sent to the first base station; or
the first message is from a source base station, and the second message is sent to a target base station, wherein a source primary cell is located in the source base station, and a target primary cell is located in the target base station.

8. User equipment (UE), comprising:
a receiver, configured to receive a first message, wherein the first message triggers a change of a security parameter of a first bearer from a first security parameter to a second security parameter, the first bearer is a signaling radio bearer or a data radio bearer, and the security parameter of the first bearer comprises a key or a security algorithm;
a transmitter, configured to send a second message, wherein the second message indicates that the change of the security parameter of the first bearer is completed; and
a processor, configured to, after the second message is sent, perform first security processing on uplink data on the first bearer, to obtain second uplink data, wherein the first security processing comprises: integrity protection for data on the signaling radio bearer, encryption processing for the data on the signaling radio bearer, or encryption processing for data on the data radio bearer; and
wherein the transmitter is further configured to send the second uplink data, wherein the second uplink data comprises a first security parameter indication, and the first security parameter indication indicates a third security parameter used in the first security processing of the second uplink data, and wherein the first security parameter indication is a logical channel identifier, and different logical channel identifiers separately correspond to the first security parameter and the second security parameter.

9. The UE according to claim 8, wherein:
the receiver is further configured to receive downlink data on the first bearer, wherein the downlink data is obtained through the first security processing, the downlink data comprises a second security parameter indication, and the second security parameter indication indicates a fourth security parameter used in the first security processing of the downlink data; and
the processor is further configured to select the fourth security parameter according to the second security parameter indication in the downlink data, and perform second security processing on the downlink data, wherein the second security processing comprises: an integrity protection check for data on the signaling radio bearer, decryption processing for the data on the signaling radio bearer, or decryption processing for data on the data radio bearer.

10. The UE according to claim 9, wherein:
the second security parameter indication is a logical channel identifier; or
the second security parameter indication is a bit, and a value change of the bit indicates that the security parameter of the first bearer has changed from the first security parameter to the second security parameter.

11. The UE according to claim 9, wherein the processor is further configured to:
  when the fourth security parameter is the first security parameter, perform the second security processing on the downlink data using the first security parameter; or
  when the fourth security parameter is the second security parameter, perform the second security processing on the downlink data using the second security parameter.

12. The UE according to claim 8, wherein different logical channel identifiers separately corresponding to the first security parameter and the second security parameter comprises:
  a first logical channel identifier of a first logical channel and a second logical channel identifier of a second logical channel corresponding to the first security parameter, and a third logical channel identifier of a third logical channel and a fourth logical channel identifier of a fourth logical channel correspond to the second security parameter, wherein the first logical channel and the second logical channel carry data that is on the first bearer and that is obtained through the first security processing using the first security parameter, and the third logical channel and the fourth logical channel carry data that is on the first bearer and that is obtained through the first security processing using the second security parameter; or
  a fifth logical channel identifier of a fifth logical channel corresponding to the first security parameter, and a sixth logical channel identifier of a sixth logical channel corresponding to the second security parameter, wherein the fifth logical channel carries data that is on the first bearer and that is obtained through the first security processing using the first security parameter, and the sixth logical channel carries data that is on the first bearer and that is obtained through the first security processing using the second security parameter.

13. The UE according to claim 8, wherein the first message further comprises information about a logical channel, the information about the logical channel comprises a logical channel identifier of the logical channel, and the logical channel carries data that is on the first bearer and that is obtained through the first security processing using the second security parameter.

14. The UE according to claim 8, wherein:
  the first message is from a first base station, and the second message is sent to the first base station; or
  the first message is from a source base station, and the second message is sent to a target base station, wherein a source primary cell is located in the source base station, and a target primary cell is located in the target base station.

15. A non-transitory computer-readable medium storing program codes for use by a processor of user equipment, wherein the program codes comprise instructions for:
  receiving a first message, wherein the first message triggers a change of a security parameter of a first bearer from a first security parameter to a second security parameter, the first bearer is a signaling radio bearer or a data radio bearer, and the security parameter of the first bearer comprises a key or a security algorithm;
  sending a second message, wherein the second message indicates that the change of the security parameter of the first bearer is completed;
  after sending the second message, performing first security processing on uplink data on the first bearer, to obtain second uplink data, wherein the first security processing comprises: integrity protection for data on the signaling radio bearer, encryption processing for the data on the signaling radio bearer, or encryption processing for data on the data radio bearer; and
  sending the second uplink data, wherein the second uplink data comprises a first security parameter indication, and the first security parameter indication indicates a third security parameter used in the first security processing of the second uplink data, and wherein the first security parameter indication is a logical channel identifier, and different logical channel identifiers separately correspond to the first security parameter and the second security parameter.

* * * * *